United States Patent
Noorkami et al.

(10) Patent No.: US 12,299,805 B1
(45) Date of Patent: May 13, 2025

(54) IMMERSIVE MEDIA CONTENT ENCODING AND RENDERING

(71) Applicant: Apple Inc., Cupertino, CA (US)

(72) Inventors: Maneli Noorkami, Sunnyvale, CA (US); Ranjit Desai, Sunnyvale, CA (US); Afshin Taghavi Nasrabadi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 17/804,801

(22) Filed: May 31, 2022

Related U.S. Application Data

(60) Provisional application No. 63/214,724, filed on Jun. 24, 2021.

(51) Int. Cl.
| | |
|---|---|
| G06T 15/08 | (2011.01) |
| G06T 9/00 | (2006.01) |
| G06T 15/04 | (2011.01) |
| G06T 17/20 | (2006.01) |

(52) U.S. Cl.
CPC .............. *G06T 15/08* (2013.01); *G06T 9/001* (2013.01); *G06T 15/04* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 11,375,170 B2 | 6/2022 | Wu et al. | |
| 11,762,461 B2 | 9/2023 | Young et al. | |
| 11,823,421 B2 | 11/2023 | Iiola et al. | |
| 11,836,885 B2 | 12/2023 | Eble et al. | |
| 11,861,788 B1 | 1/2024 | Taghavi Nasrabadi et al. | |

(Continued)

FOREIGN PATENT DOCUMENTS

| | | |
|---|---|---|
| CN | 110913202 | 1/2022 |
| CN | 115423921 | 12/2022 |

(Continued)

OTHER PUBLICATIONS

U.S. Appl. No. 17/691,691, filed Mar. 10, 2022, Khaled Mammou, et al.

(Continued)

*Primary Examiner* — Sultana M Zalalee
(74) *Attorney, Agent, or Firm* — Alexander A. Knapp; Kowert, Hood, Munyon, Rankin & Goetzel. P.C.

(57) ABSTRACT

A decoding computing device determines a focus area of a view of volumetric visual content, such as a three-dimensional (3D) object or scene, and indicates the focus area in a request for compressed volumetric visual content. A server provides a depth map and an attribute atlas that includes attribute and/or texture information for the focus area that is signaled at a higher resolution than other portions of the volumetric visual content. The decoding device also applies one or more mesh simplification techniques, wherein a higher resolution mesh is used for the focus area. The textures/attributes are projected onto the mesh representations, wherein the mesh representations and projected textures are used to reconstruct the volumetric visual content. Hole filling techniques are then applied, wherein a more sophisticated hole filling technique is used in the focus area.

20 Claims, 16 Drawing Sheets

(56) References Cited

U.S. PATENT DOCUMENTS

| | | | |
|---|---|---|---|
| 11,887,228 B2 | 1/2024 | Bridon et al. | |
| 11,948,338 B1 | 4/2024 | Mammou et al. | |
| 2007/0183649 A1* | 8/2007 | Kiefer | G06T 15/005 |
| | | | 382/154 |
| 2017/0018121 A1* | 1/2017 | Lawson | G06V 40/10 |
| 2018/0035134 A1* | 2/2018 | Pang | H04N 13/117 |
| 2018/0130255 A1* | 5/2018 | Hazeghi | H04N 13/243 |
| 2018/0192058 A1* | 7/2018 | Chen | G06T 7/11 |
| 2020/0077124 A1* | 3/2020 | Shi | H04N 21/6587 |
| 2020/0177868 A1* | 6/2020 | Varekamp | H04N 13/117 |
| 2021/0029340 A1* | 1/2021 | Wu | G06T 15/005 |
| 2021/0067840 A1* | 3/2021 | Mate | A63F 13/65 |
| 2021/0258554 A1* | 8/2021 | Bruls | H04N 13/344 |
| 2022/0078396 A1* | 3/2022 | Gül | H04L 65/65 |
| 2022/0094909 A1* | 3/2022 | Hannuksela | H04N 19/174 |

FOREIGN PATENT DOCUMENTS

| | | |
|---|---|---|
| CN | 113362449 | 1/2023 |
| CN | 110738721 | 9/2023 |
| EP | 4373096 | 5/2024 |
| WO | 2018227100 | 4/2020 |

OTHER PUBLICATIONS

U.S. Appl. No. 17/804,799, filed May 31, 2024, Afshin Taghavi Nasrabadi, et al.

* cited by examiner

Encoder block diagram

IMMERSIVE MEDIA CONTENT ENCODING AND RENDERING

BACKGROUND

This application claims benefit of priority to U.S. Provisional Application Ser. No. 63/214,724, entitled "Immersive Media Content Encoding and Rendering Using Gaze-Based Simplification," filed Jun. 24, 2021, and which is hereby incorporated herein by reference in its entirety.

TECHNICAL FIELD

This disclosure relates generally to compression and decompression of three-dimensional (3D) volumetric content, such as immersive media content.

DESCRIPTION OF THE RELATED ART

Three-dimensional (3D) volumetric content may be generated using images captured by multiple cameras positioned at different camera angles and/or locations relative to an object or scene to be captured. The 3D volumetric content includes attribute information for the object or scene, such as color information (e.g. RGB values), texture information, intensity attributes, reflectivity attributes, or various other attributes. In some circumstances, additional attributes may be assigned, such as a time-stamp when the 3D volumetric content was captured. The 3D volumetric content also includes geometry information for the object or scene, such as depth values for surfaces of the object or depth values for items in the scene. Such 3D volumetric content may make up "immersive media" content, which in some cases may comprise a set of views each having associated spatial information (e.g. depth) and associated attributes. In some circumstances, 3D volumetric content may be generated, for example in software, as opposed to being captured by one or more cameras/sensors. In either case, such 3D volumetric content may include large amounts of data and may be costly and time-consuming to render at a decoding device.

Summary of Embodiments

In some embodiments, a plurality of images captured from a plurality of camera angles are received by an encoder. Based on the received images, the encoder generates an atlas comprising attribute values, such as colors, textures, etc. for views of a 3D scene or 3D object along with a corresponding depth map comprising depth values for the views of the 3D scene or 3D object. The encoder may be implemented at a server that receives a request for a portion of the 3D scene or 3D object from a rendering client. The request may indicate the portion of the 3D scene or 3D object that is to be rendered and may further indicate one or more focus areas for the portion of the 3D scene or 3D object that is to be rendered. For example, the rendering client may use signals received from one or more sensors of the rending client, or a device in communication with the rendering client, to determine the one or more focus areas. The one or more focus areas may correspond to a gaze direction of a user of the rendering client. For example, the rendering client may be a head-mounted display including inertial sensors and the head-mounted display may determine a gaze direction of a user of the head-mounted display based on inputs from the inertial sensors. Furthermore, the gaze direction may be projected out into a portion of the 3D scene or 3D object to be rendered to determine a focus area (or set of focus areas). The rendering client may indicate the focus area in a request to the encoder (e.g. server or other computing device) for information for rendering the portion of the 3D scene or 3D object. Also, the encoder may encode multiple versions of the attribute atlas, wherein different respective versions correspond to different respective focus areas, and wherein attributes are encoded at a higher resolution in the respective focus areas than in other areas of the encoded portions of the attribute atlases for the 3D scene or 3D object. Thus, the encoder may provide the rendering client with a version of the attribute atlas corresponding to the requested focus area, wherein the provided attribute atlas includes attribute values in the focus area that are encoded at a higher resolution than other areas of the attribute atlas. Additionally, the encoder may provide the client device a depth map for the portion of the 3D object or 3D scene to be rendered.

The rendering client receives the depth map for the portion of the 3D scene or 3D object to be rendered and may perform variable mesh simplification when generating a mesh representation of the 3D scene or 3D object using the depth map. For example, the rendering client may allocate a greater mesh vertices budget to mesh portions corresponding to the focus area than other mesh vertices budgets that are allocated to generating other mesh portions outside of the focus area. The rendering client may further project textures included in the received attribute atlas for the specified focus area onto the generated mesh portions. The higher resolution texture portions corresponding to the focus area may be projected onto the higher mesh vertices budget portions of the generated mesh representation corresponding to the focus area. In this way, the 3D scene or 3D object may be rendered at the rendering client with a more dense mesh in the focus area and with a higher resolution texture in the focus area. Such an approach may provide lower latency transmission of immersive media content and lower complexity rendering than sending the full texture at the higher resolution and rendering the full mesh using the higher mesh vertices budget. Also, such an approach may provide a higher quality viewing experience than using a lower resolution mesh or a lower resolution texture. Moreover, improvements in latency due to a smaller file size for the lower resolution texture and reductions in complexity for rendering the smaller mesh vertices budget for non-focus areas portions of the 3D scene or 3D object may provide a smoother user experience than if a full resolution texture and higher mesh vertices budget were used for the whole 3D scene or 3D object.

In some embodiments, the rendering client may further fill holes in a reconstructed mesh representation of the 3D scene or 3D object, wherein different respective hole-filling techniques of different complexities are used based on whether or not a hole is being filled in the focus area or outside of the focus area. For example, the generated mesh representations generated from the depth map may include multiple sub-meshes. Corresponding textures from the attribute atlas may be projected onto the sub-meshes. The sub-meshes with projected textures may then be stitched together to generate the reconstructed version of the 3D scene or 3D object. However, discontinuities at boundaries of the sub-meshes being stitched together may generate holes. Thus, a hole filling technique may sample sub-meshes/textures adjacent to a given hole to determine values to be used to fill the hole. For areas outside of the focus area, a less complicated hole filling technique may be used, such as linear interpolation (or leaving the holes unfilled), whereas within the focus area more complex hole filling techniques may be used, as described herein.

In some embodiments, program instructions for a decoder (e.g. client device), when executed on or across one or more processors, cause the one or more processors to issue a request for information for rendering a three-dimensional (3D) object or scene, wherein the request indicates a portion of the 3D object or scene to be displayed and indicates a focus area within the portion of the 3D object or scene to be displayed. The program instructions, further cause the one or more processors to receive a depth map comprising depth values for the portion of the 3D object or scene to be displayed and receive an atlas comprising attribute or texture values for the portion of the 3D object or scene to be displayed, wherein attributes or textures of the focus area are signaled in the atlas at a higher resolution than other areas of the portion of the 3D object or scene to be displayed. Additionally, the program instructions cause the one or more processors to generate, based on the depth values included in the depth map, one or more mesh representations for the portion of the 3D object or scene to be displayed, wherein a higher mesh resolution is allocated for one or more portions of the one or more mesh representations in the focus area than are allocated for other portions of the one or more mesh representations. Also, the program instructions cause the one or more processors to project the attribute or texture values indicated in the atlas onto the generated one or more mesh representations, wherein the higher resolution attribute or textures of the focus area are projected onto the higher resolution portions of the one or more mesh representations of the focus area.

In some embodiments, program instructions for an encoder (e.g. server device or other computing device), when executed on or across one or more processors, cause the one or more processors to receive images of a three-dimensional (3D) object or scene, wherein the images are captured from a plurality of camera viewing angles and generate, based on the received images, a depth map comprising depth values for views of a portion of the 3D object or scene. The program instructions also cause the one or more processors to generate, based on the received images, a plurality of atlases comprising attribute values for views of a portion of the 3D object or scene, wherein the plurality of atlases comprise a first atlas comprising attributes or textures of a first focus area for a portion of the 3D object or scene that are signaled at a higher resolution than remaining areas of the 3D object or scene and one or more additional atlases comprising attributes or texture of one or more other focus areas for the portion of the 3D object or scene that are signaled at the higher resolution as compared to remaining areas of the 3D object or scene. Additionally, the program instructions cause the one or more processors to receive a request indicating a portion of the 3D object or scene to be displayed and further indicating a focus area within the portion of the 3D object or scene to be displayed. Based on the request, the program instructions cause the one or more processors to select a given one of the plurality of atlases corresponding to the indicated portion of the object or scene to be displayed and comprising attribute or texture values signaled at a higher resolution for a focus area corresponding to the focus area indicated in the request, and provide, in response to the request, the selected atlas for the portion of the 3D object or scene to be displayed.

BRIEF DESCRIPTION OF THE DRAWINGS

FIG. 1A further illustrates the encoder providing a depth map and attribute atlas, wherein the client device renders the 3D volumetric content using a greater mesh budget for the focus area, a higher resolution texture for the focus area, and a more sophisticated hole filling technique for the focus area, according to some embodiments.

FIG. 2A further illustrates the client device rendering the 3D volumetric content with the other focus area using a greater mesh budget for the other focus area, a higher resolution texture for the other focus area, and a more sophisticated hole filling technique for the other focus area, according to some embodiments.

Figure 1A:
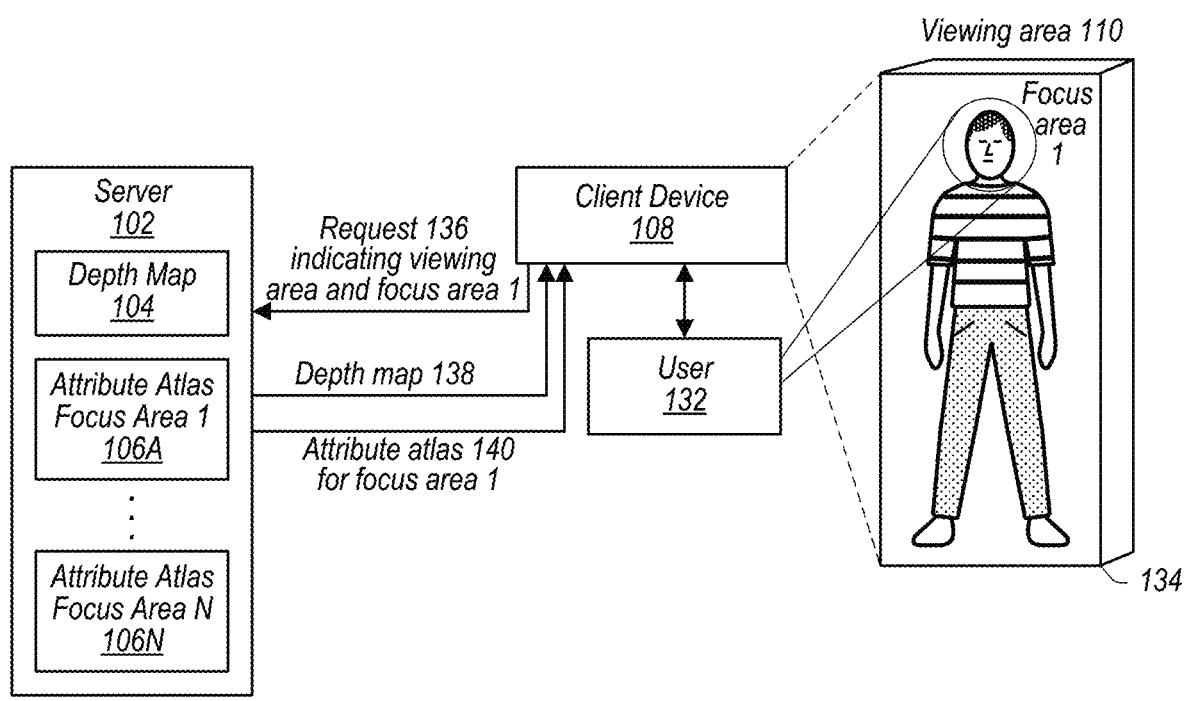
FIG. 1A illustrates a client device requesting three-dimensional (3D) volumetric content from an encoder, wherein the request indicates a focus area for viewing the 3D volumetric content.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances. A may be determined based solely on B.

DETAILED DESCRIPTION

As data acquisition and display technologies have become more advanced, the ability to capture three-dimensional (3D) volumetric content, such as immersive video content, has increased. Also, the development of advanced display technologies, such as augmented reality, mixed reality, virtual reality, so forth, has increased potential uses for 3D volumetric content, such as immersive video. However, 3D volumetric content files are often large. Such large files may be costly and/or time-consuming to store and transmit. Also, such large files may be computationally intensive to render at display devices. For example, such 3D volumetric content may require generating and rendering a large number of vertices which may increase requirements on computational capabilities of a given rendering device and/or increase rendering time.

In some embodiments, an encoding computing device may be used to generate a compressed version of the 3D volumetric content. In some embodiments, a system may include an encoding module that compresses attribute and/or spatial information of a 3D volumetric point cloud or immersive video content file such that the file may be stored and transmitted more quickly than non-compressed 3D volumetric content and in a manner such that the compressed 3D volumetric content file may occupy less storage space than non-compressed 3D volumetric content. In some embodiments, such compression may enable 3D volumetric content to be communicated over a network in real-time or in near real-time, on-demand and responsive to user instructions.

In some embodiments, a system may include a decoder that receives encoded 3D volumetric content comprising video encoded attribute information and video encoded geometry information via a network from a remote server or other storage device that stores or generates the 3D volumetric content files. For example, a user device or controller for a user device may be manipulated in real-time or near real-time to show different portions of a virtual world represented by visual volumetric content. In order to update the visual volumetric content, a system associated with the decoder may request data from the remote server based on user manipulations (or anticipated user manipulations) of the user device or associated controller and the data may be transmitted from the remote server to the decoder in a form of encoded visual volumetric content (e.g. video encoded attribute patch images and video encoded depth patch images/depth maps). The visual volumetric content being displayed may then be updated with updated data responsive to the user manipulations, such as updated views.

However, instead of rendering a mesh representing the 3D object or scene that includes a vertex for each pixel included in the depth patch images or depth maps, a decoding computing device (e.g. decoder) may simplify the mesh. For example, a decoder may generate vertices for only a sub-set of the depth values indicated by pixels of the depth map. This may lead to a lower resolution mesh being generated that includes larger polygons or triangles. Such a lower resolution mesh may use less computational resources to render at the decoding device than a higher resolution mesh. Alternatively, or additionally, an encoding computing device may encode the depth map using a lower resolution of pixels such that fewer mesh vertices are generated by a decoder, and such that a rendered mesh has a lower resolution of vertices and includes larger polygons or triangles, than would have been the case if a higher resolution of pixels was included in the depth map (not taking into account sub-sampling at the decoder).

However instead of using a lower resolution mesh for the whole 3D object or scene, a portion of the 3D object or scene corresponding to a focus area for viewing the 3D object or scene may be rendered using a higher resolution mesh. In some embodiments, a decoding computing device (e.g. decoder) may determine a focus area for viewing the 3D object or scene based on a gaze direction of a user or of the decoding computing device.

In some embodiments, the decoding computing device further communicates the determined focus area and/or gaze direction to a server device providing a compressed version of the 3D volumetric content. For example, a server device may provide a depth map and attribute atlas for the 3D object or scene. In some embodiments, a server device may provide a depth map and a particular attribute atlas comprising attribute/texture patches for the 3D object or scene, where attribute/texture patches falling within the focus area are signaled in the attribute atlas using a higher pixel resolution than are other attribute/texture patches for portions of the 3D object or scene outside of the focus area. In some embodiments, multiple focus areas may be determined with varying levels of importance and attribute/texture patches may be signaled with varying pixel resolutions based on the relative importance of the patches (e.g. is a patch in a central focus area, a peripheral focus area, etc.).

In some situations, attribute/texture patches when projected onto a mesh may result in holes. For example, captured images, captured from a plurality of points of view, may have been used to generate the attribute/texture patches. However, depending on characteristics of the 3D object or scene and/or based on the viewing angles of cameras that captured the plurality of images, some portions of the scene or 3D object may be occluded by other portions of the scene or 3D object. For example, a line of sight of a camera capturing images of the 3D object or scene may be obstructed by an object in the foreground such that a portion of an object in the background is occluded in particular views. When the 3D object or scene is recreated such occluded portions may materialize of "holes" when the 3D object or scene. To address such holes hole filling techniques are used to generate attribute or texture data for the "holes" to fill the holes. Often the holes are filled using a hole filling technique that determines attribute or texture values for mesh portions in a "hole" based on attribute or texture values for portions of the mesh adjacent to the hole.

In some embodiments, various hole filling techniques having varying levels of complexity may be used to fill holes, wherein more complex hole filling techniques are used to fill holes in a central focus area and less complex hole filling techniques are used to fill holes in a peripheral focus area. In some embodiments, holes outside of a focus area may remain unfilled or may be filled with a simpler hole filling technique than is used in the central focus area and the one or more peripheral focus areas.

In some embodiments, as part of generating the 3D volumetric content, sensors may capture attribute information for one or more points, such as color attributes, texture attributes, reflectivity attributes, velocity attributes, acceleration attributes, time attributes, modalities, and/or various other attributes. For example, in some embodiments, an immersive video capture system, such as that may follow MPEG immersive video (MIV) standards, may use a plurality of cameras to capture images of a scene or object from a plurality of viewing angles and/or locations and may further use these captured images to determine spatial information for points or surfaces of the object or scene, wherein the spatial information and attribute information is encoded using video-encoded attribute image patches and video encoded depth patch images/depth maps as described herein.

Gaze-Based Simplification

High quality immersive video rendering and playback involves re-projecting source views to the 3D world and blending them. Rendering can be done using mesh-based or image-based rendering techniques. Mesh-based techniques can provide higher motion parallax and better quality than image-based rendering, but mesh-based rendering techniques are more compute-intensive. For highest quality, mesh-based rendering creates one vertex for each pixel of a depth map. This results in a large number of vertices that are difficult to handle or exceed the capabilities of GPUs to provide acceptable frame-rate. This problem can be addressed by down-sampling the mesh uniformly. However, uniform down-sampling generates a coarser mesh and reduces quality. For example, fine geometry details are not preserved. In addition, rendering a high resolution texture and using hole filling techniques to fill occluded areas adds additional computational burdens and challenges to run on mobile platforms with limited CPU/GPU and power budget.

In order to address these issues, gaze data is used to provide a highest quality immersive media rendering experience where a user is looking. For example, the mesh resolution can be preserved where the user is looking, but decimated everywhere else in the viewport. Moreover, a foveated texture can be used, wherein the texture has the highest resolution where the user's gaze is directed, but a lower resolution elsewhere. Texture simplification (e.g. generating a foveated texture) can be performed at a server, where the server generates/stores different renditions of the camera texture and the client only downloads the rendition that is close to where the user's gaze is directed. Additionally, in some embodiments, gaze prediction can be used to reduce the latency of streaming particular renditions of the texture. In some embodiments, the texture decimation can be performed on the client device to reduce latency as compared to performing the full texture decimation at the server.

When the user moves the user device, areas uncovered that were not captured by any camera may appear. In such situations, hole filling techniques can be used to fill the holes. Uses of advanced hole filling techniques across a viewport can be computationally intensive, particularly on battery-powered or other mobile platforms. Thus, gaze data can be used to run a more involved algorithm and higher quality hole filling technique where the gaze is directed, while using a less involved algorithm or lesser quality hole filling technique for portions of the 3D object or scene where the gaze is not directed.

Figure 1B:
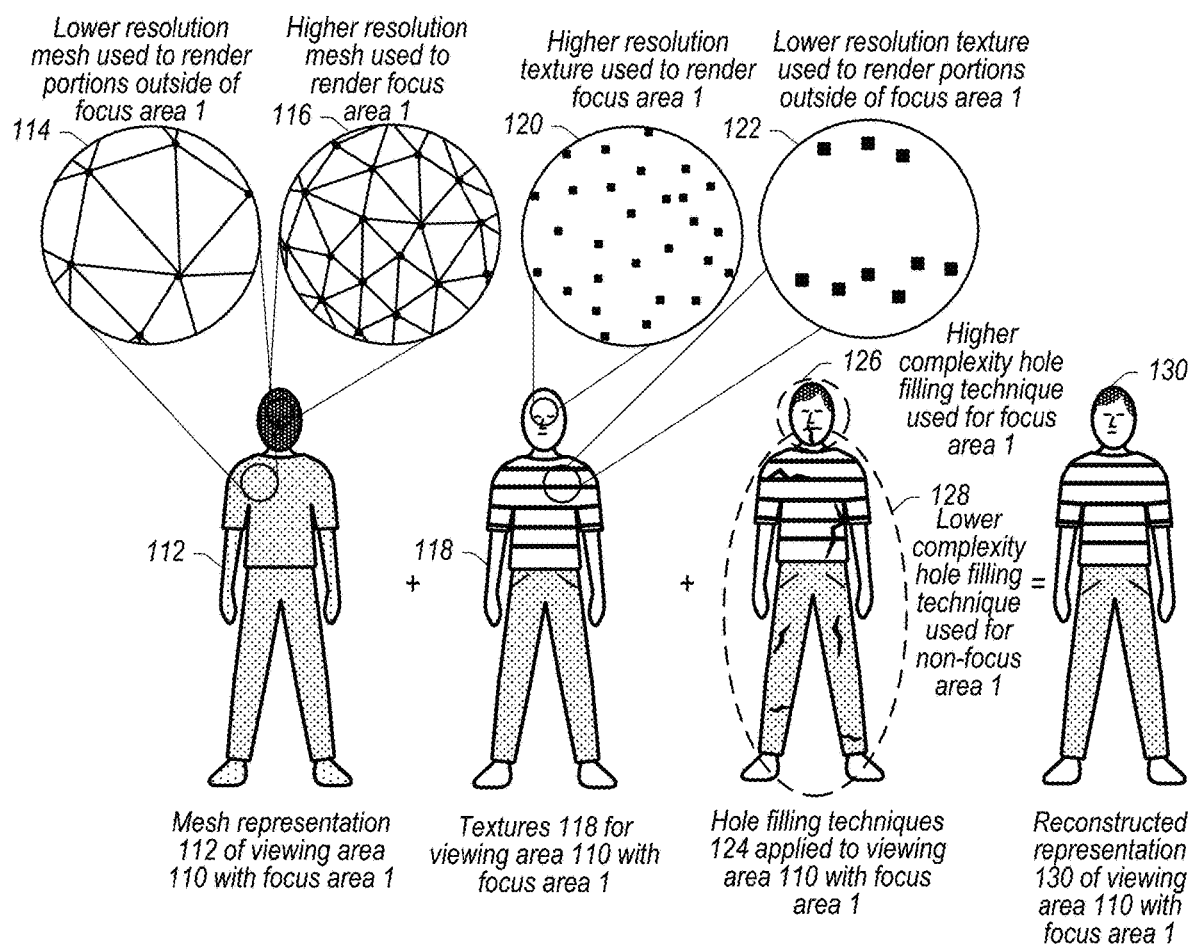
FIG. 1B illustrates the client device rendering the 3D volumetric content using the greater mesh budget for the focus area, a higher resolution texture for the focus area, and a more sophisticated hole filling technique for the focus area, according to some embodiments.

FIG. 1 illustrates a client device requesting three-dimensional (3D) volumetric content from an encoder, wherein the request indicates a focus area for viewing the 3D volumetric content. FIG. 1 further illustrates the encoder providing a depth map and attribute atlas based on the indicated focus area, wherein the client device renders the 3D volumetric content using a greater mesh budget for the focus area, a higher resolution texture for the focus area, and a more sophisticated hole filling technique for the focus area, according to some embodiments.

Client device 108, which may be a head-mounted display worn by user 132, is rendering and/or displaying 3D volumetric content 134 in viewing area 110 with focus area 1. In order to render and/or display the 3D volumetric content 134, the client device 108 sends request 136 to server 102, wherein request 136 indicates that the client device is to render and/or display viewing area 110 with focus area 1.

The server 102, stores a depth map 104 for the viewing area 110 and stores multiple attribute atlases 106A through 106N for viewing area 110, each having a different focus area, such as focus areas 1 through N. In some embodiments, the server 102 generates the depth map 104 and the attribute atlases 106A through 106N based on received images showing the volumetric content 134 from multiple viewing angles or viewing locations. Examples of how depth maps and attribute atlases are generated is further described in detail in regard to FIGS. 4-7 below. These example techniques may be used by server 102 in some embodiments, to generate depth map 104 and attribute atlas 106. Furthermore, server 106 may generate foveated versions of the attribute atlas for different focus areas. In some embodiments, the server 102 proactively generates and stores multiple attribute atlas versions for different focus areas, before receiving request 136. In some embodiments, the server 102 generates a particular foveated attribute atlas having a particular focus area in response to request 136 indicating the particular focus area.

In response to receiving request 136, server 102 provides client device 108 depth map 138 for viewing area 110 and attribute atlas 140 for viewing area 110 that has been foveated to show textures/attributes of focus area 1 at a higher resolution than is used to signal other textures/attributes for other portions of viewing area 110.

As shown in the lower portion of FIG. 1, the client device 108 generates a mesh representation 112 based on depth values indicated in depth map 138. However, instead of generating a mesh vertex for every pixel indicating a depth value in depth map 138, client device 108 allocates different mesh vertices budgets based on focus area. For example lower resolution mesh 114 is generated for portions of viewing area 110 outside of focus area 1 and higher resolution mesh 116 is generated for portions of viewing area 110 within focus area 1. In some embodiments, a mesh simplification algorithm may be applied by client device 108 to simplify portions of viewing area 110 outside of focus area 1.

Also, textures 118 are generated for viewing area 110, wherein higher resolution texture patch images are included in attribute atlas 140 for focus area 1 and are used to generate higher resolution texture 120, whereas lower resolution texture patch images are included in attribute atlas 140 for portions of viewing area 110 outside of focus area 1 and are used to generate lower resolution texture 122.

When the mesh representations 112 and textures 118 are projected onto one another and stitched together some portions of the 3D object or 3D scene may be occluded and result in holes in the reconstructed 3D object or 3D scene. Thus, the client device 108 applies hole filling algorithms 124 to fill the holes. In some embodiments, a higher complexity/more sophisticated hole filling algorithm 126 may be used to fill holes falling in focus area 1 and a lower complexity/less sophisticated hole filling algorithm 128 may be used to fill holes outside of focus area 1. The mesh representations, textures, and hole filling techniques may be used to generate reconstructed version 130 of the signaled 3D object or 3D scene, wherein the focus area of the viewing area 110 results in generated reconstructed version 130 of the 3D object or scene having a higher mesh resolution and a higher texture resolution in the focus area 1.

Figure 2A:
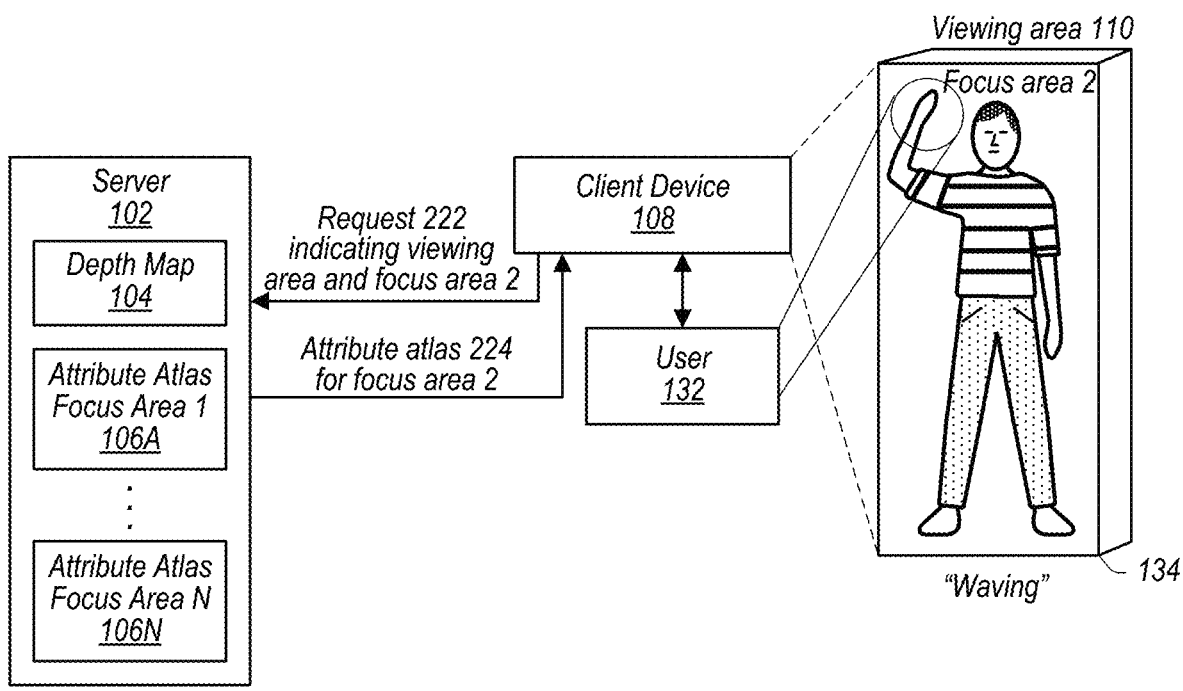
FIG. 2A illustrates the client device requesting updated 3D volumetric content for another focus area for viewing the 3D volumetric content and receiving another attribute atlas for the updated focus area from the server.
Figure 2B:
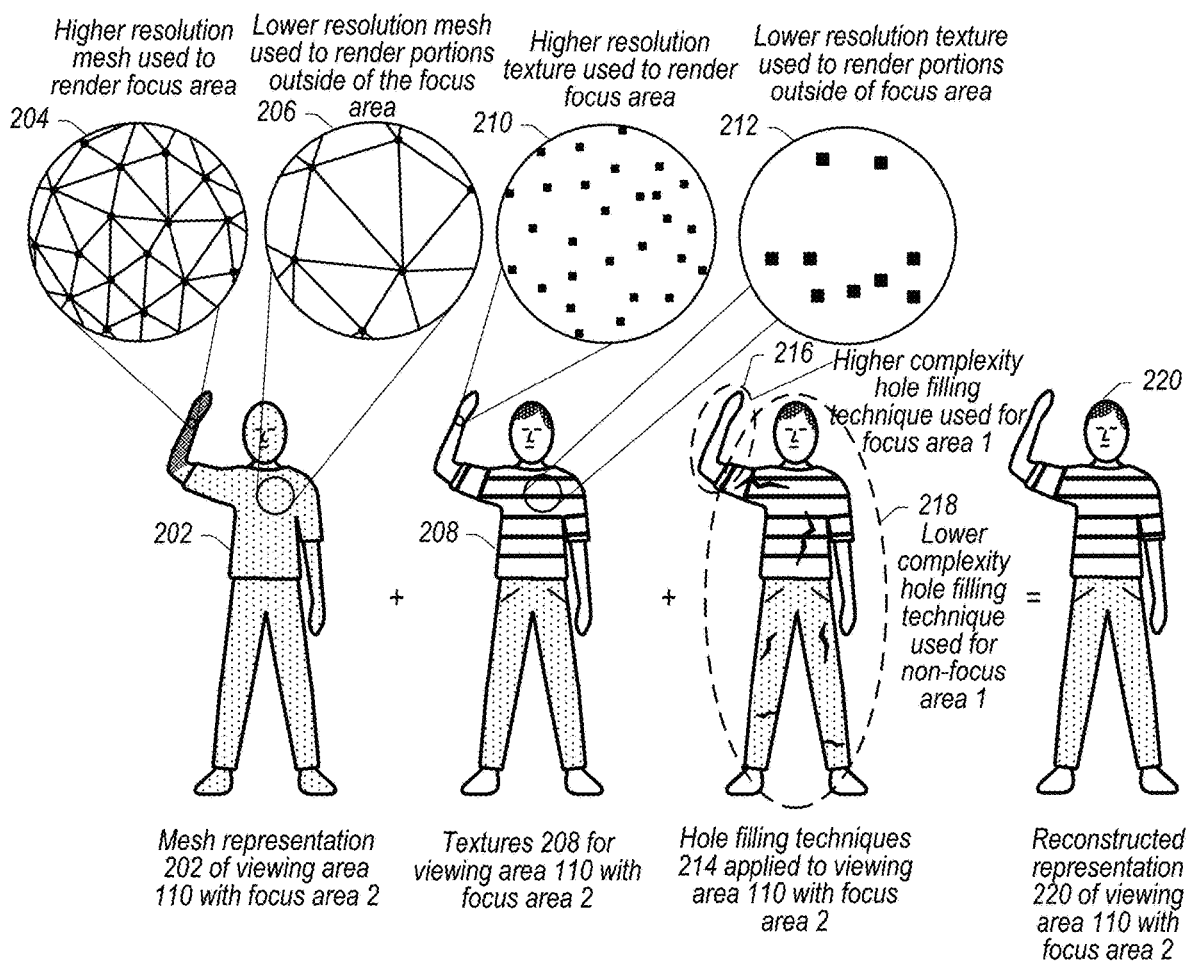
FIG. 2B illustrates the client device rendering the 3D volumetric content using the greater mesh budget for the other focus area, a higher resolution texture for the other focus area, and a more sophisticated hole filling technique for the other focus area, according to some embodiments.

FIG. 2 illustrates the client device requesting updated 3D volumetric content for another focus area for viewing the 3D volumetric content and receiving another attribute atlas for the updated focus area from the server. FIG. 2 further illustrates the client device rendering the 3D volumetric content with the other focus area using a greater mesh budget for the other focus area, a higher resolution texture for the other focus area, and a more sophisticated hole filling technique for the other focus area, according to some embodiments.

When a focus area in the viewing area 110 changes, the client device 108 may issue a new request, such as request 222 indicating focus area 2 and receive another version of the attribute atlas for the indicated focus area, such as attribute atlas 224 for focus area 2. As an example, user 132 may change the gaze direction from the face of the person represented in viewing area 110 (e.g. focus area 1) to instead the hand of the person represented in viewing area 110 (e.g. focus area 2). In some embodiments, the gaze direction and/or focus area may be determined based on sensor inputs, such as inertial measurement unit(s), which may be included in client device 108. In some embodiments, client device 108 may anticipate changes in focus area based on sensor inputs, past user history, machine learning, etc. and may pre-fetch an attribute atlas for an anticipated next focus area.

In the lower portion of FIG. 2, the client device generates an updated representation of the person in viewing area 110.

Note that the person's arm has changed position and is now the focus area (e.g. focus area 2). Thus, a higher resolution mesh 204 is used in the mesh representation 202 for the arm/hand and a lower resolution mesh 206 is used for portions of the mesh representation 202 outside of focus area 2, such as the face. Likewise, higher resolution texture patch images in attribute atlas 224 for focus area 2 are used to generate higher resolution texture 210 for the arm, whereas lower resolution texture patch images in attribute atlas 224 are used to generate lower resolution texture 212 for remaining portions of the viewing area 110, such as the face. Also, a higher complexity hole filling technique 216 is used to fill holes in focus area 2, whereas the client device 108 uses a lower complexity hole filling technique 218 for portions of viewing area 110 outside of focus area 2. The mesh representation 202, the generated textures 208 and the hole filling techniques 214 are used to reconstruct the 3D volumetric content as reconstructed representation 220 with focus area 2.

Figure 3A:
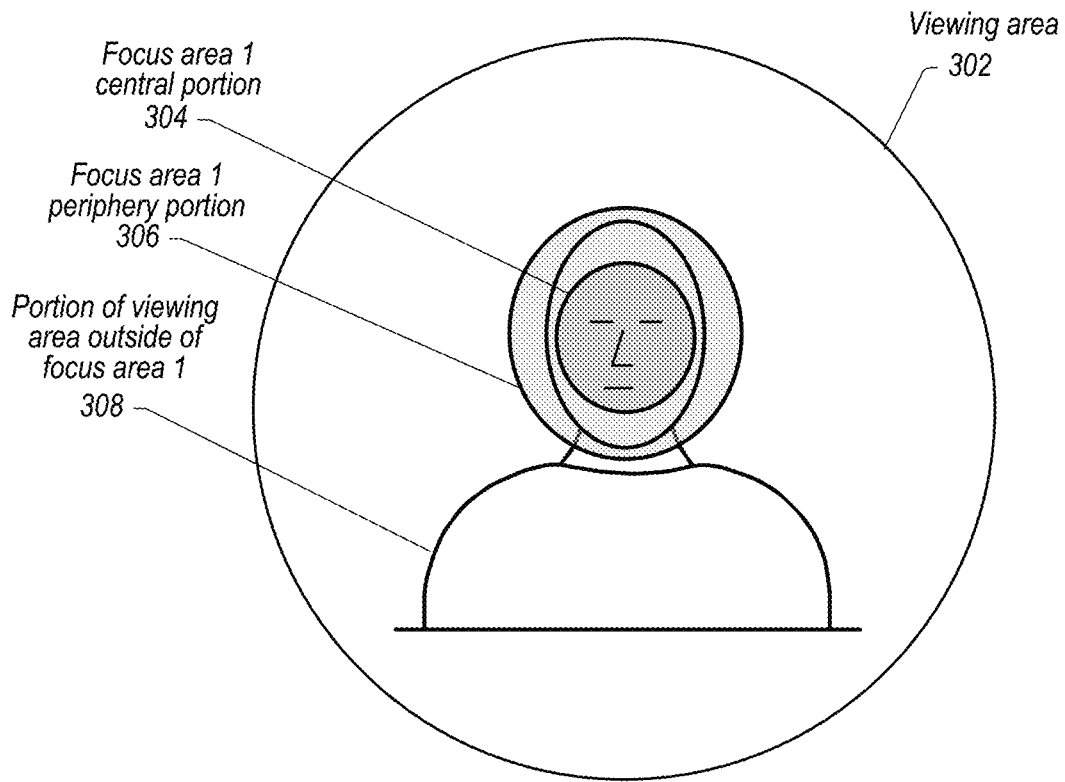
FIG. 3A illustrates a viewing area for rendering 3D volumetric content wherein a client device determines a central focus area of the viewing area, one or more peripheral focus areas of the viewing area, and wherein another portion of the viewing area is outside of the focus area, according to some embodiments.

FIG. 3A illustrates a viewing area for rendering 3D volumetric content wherein a client device determines a central focus area of the viewing area, one or more peripheral focus areas of the viewing area, and wherein another portion of the viewing area is outside of the focus area, according to some embodiments.

In some embodiments, a client device, such as client device 108, may determine more than one focus area and may indicate the multiple focus areas in a request to an encoder, such as server 102. For example, in viewing area 302, client device 108 has identified a central portion of focus area 1 (304) and a peripheral portion of focus area 1 (306). Additionally, another portion 308 of the viewing area 302 is outside of the identified focus areas. The client device may indicate central focus area 304 and peripheral focus area 306 in a request, such as request 136 or 222. In response, an encoder, such as server 102, may provide an attribute atlas with attribute/texture patches signaled using multiple different resolutions. For example, the attribute/texture patches corresponding to the central focus area 304 may be signaled at a first resolution, the attribute/texture patches corresponding to the peripheral focus area 306, may be signaled at a second (lower) resolution, and attribute/texture patches corresponding to portions 308 may be signaled at a third resolution that is lower than the first and second resolution.

Also, the client device may apply multiple mesh simplification/decimation algorithms to simplify portions of the mesh falling in the different focus area portions.

Figure 3B:
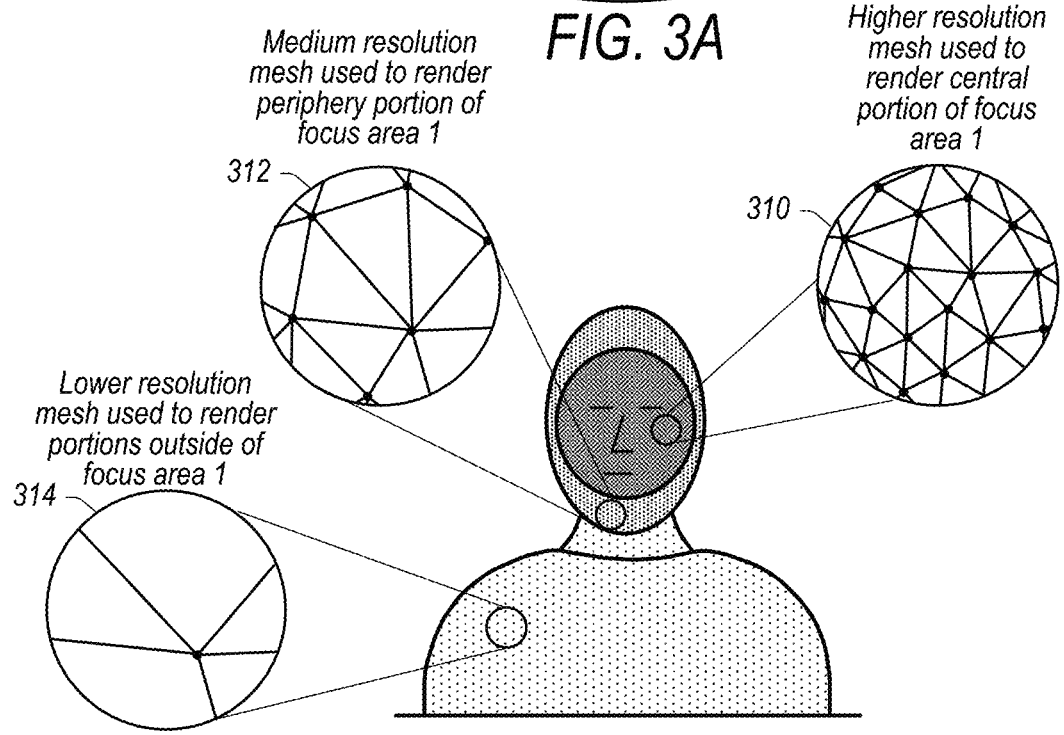
FIG. 3B illustrates a client device rendering a mesh representation of the 3D volumetric content, wherein a higher mesh vertices budget is allocated to the central focus area, an intermediate mesh vertices budget is allocated to the peripheral focus area(s), and a lower mesh vertices budget is allocated to portions of the viewing area outside of the focus areas, according to some embodiments.

For example, FIG. 3B illustrates a client device rendering a mesh representation of the 3D volumetric content, wherein a higher mesh vertices budget is allocated to the central focus area, an intermediate mesh vertices budget is allocated to the peripheral focus area(s), and a lower mesh vertices budget is allocated to portions of the viewing area outside of the focus areas, according to some embodiments.

As can be seen in FIG. 3B, central focus area 304 is rendered using a first mesh resolution 310 that is higher than mesh resolutions 312 and 314. Peripheral focus area 306 is rendered using mesh resolution 312 which is a lower resolution than mesh resolution 310 but greater than mesh resolution 314. Additionally, portions 308 are rendered using mesh resolution 314 which is a lower mesh resolution than mesh resolutions 310 and 312.

Figure 3C:
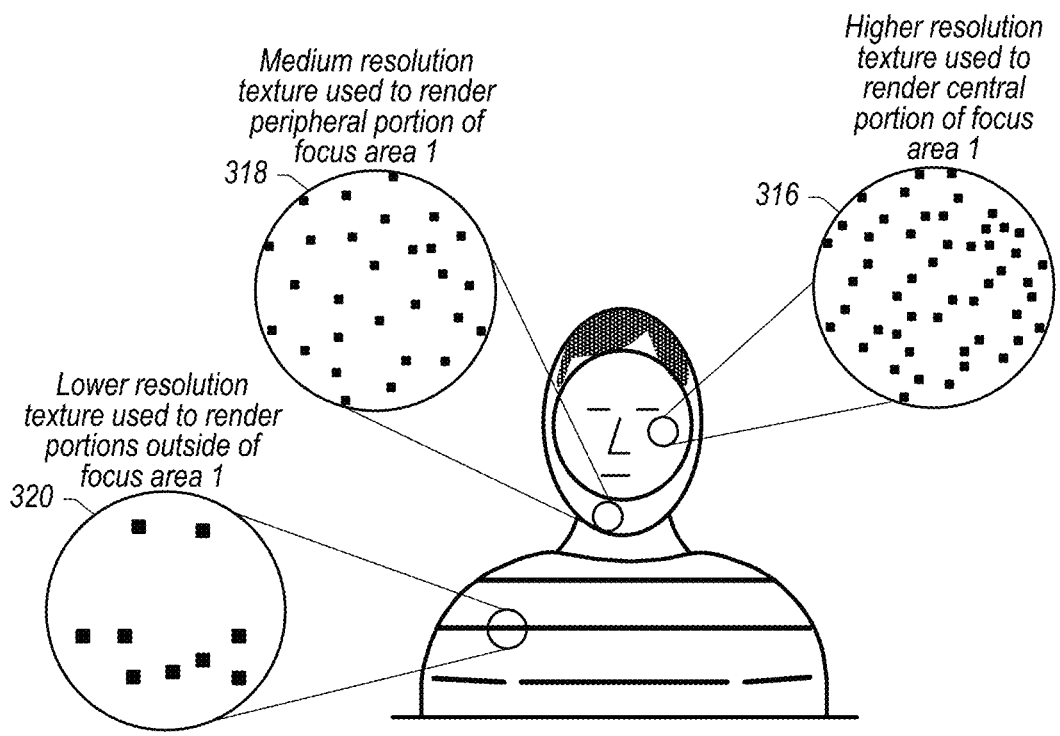
FIG. 3C illustrates textures to be projected onto the mesh representation, wherein a higher resolution texture is used for the central focus area, an intermediate resolution texture is used for the peripheral focus area, and a lower resolution texture is used for portions of the viewing area outside of the focus area, according to some embodiments. In some embodiments, the varying resolution textures may be included in an attribute atlas received at the client device from a server, based on a request indicating the focus area (and/or central and peripheral focus areas), according to some embodiments.

FIG. 3C illustrates textures to be projected onto the mesh representation, wherein a higher resolution texture is used for the central focus area, an intermediate resolution texture is used for the peripheral focus area, and a lower resolution texture is used for portions of the viewing area outside of the focus area, according to some embodiments. In some embodiments, the varying resolution textures may be included in an attribute atlas received at the client device from a server, based on a request indicating the focus area (and/or central and peripheral focus areas), according to some embodiments.

As discussed above, the server 102 may provide an attribute atlas comprising attribute/texture patch images that are signaled using varying resolutions based on focus area importance. Using these provided attribute/texture patch images, client device 108 generates a higher resolution texture 316 for central focus area 304, a medium resolution texture 318 for peripheral focus area 306, and a lower resolution texture 320 for portions 308 outside of focus area 1.

Figure 3D:
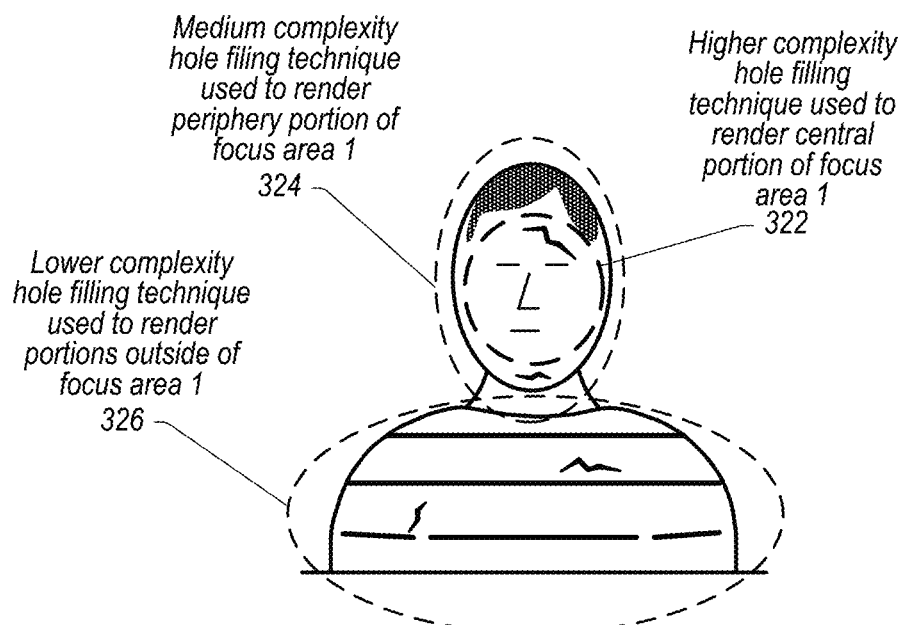
FIG. 3D illustrates, at least three different hole filling techniques being used to fill holes in a reconstructed version of the 3D volumetric content, wherein a higher complexity hole filling technique is used to fill holes in the central focus area, an intermediate complexity hole filling technique is used to fill holes in the peripheral focus area, and a lower complexity hole filing technique is used to fill holes in portions of the 3D volumetric content outside of the focus area, according to some embodiments.

FIG. 3D illustrates, at least three different hole filling techniques being used to fill holes in a reconstructed version of the 3D volumetric content, wherein a higher complexity hole filling technique is used to fill holes in the central focus area, an intermediate complexity hole filling technique is used to fill holes in the peripheral focus area, and a lower complexity hole filing technique is used to fill holes in portions of the 3D volumetric content outside of the focus area, according to some embodiments.

In a similar manner as discussed above, client device 108 uses a higher complexity hole filling technique 322 for central focus area 304, an intermediate complexity hole filling technique 324 for peripheral focus area 306, and a lower complexity hole filling technique (or no hole filling technique) 326 for portions 308 outside of focus area 1.

Generating 3D Volumetric Content

In some embodiments, 3D volumetric content that is to be encoded/compressed and decoded/decompressed, as described herein, may be generated from a plurality of images of an object or scene representing multiple views of the object or scene, wherein additional metadata is known about the placement and orientation of the cameras that captured the multiple views.

Figure 4A:
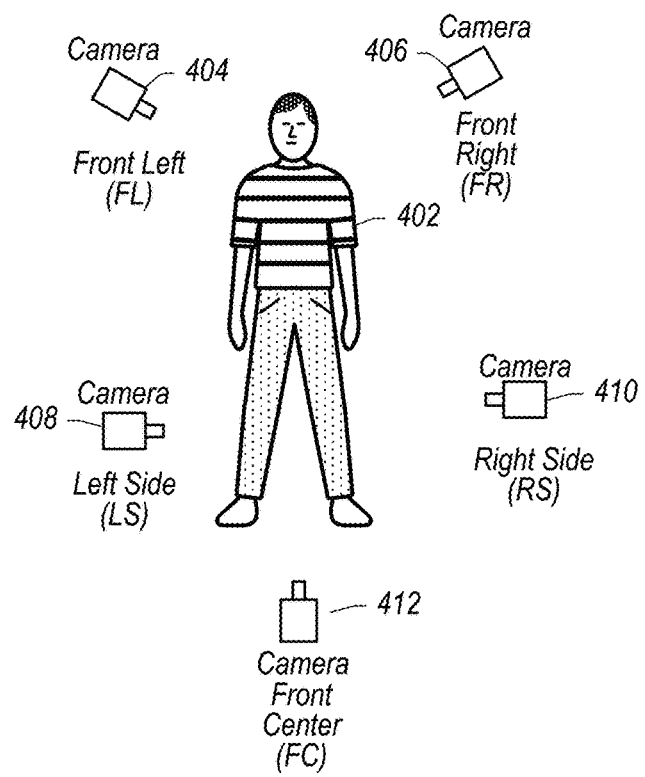
FIG. 4A illustrates a front view of a plurality of cameras located at different locations and/or camera angles relative to an object or scene, wherein the cameras capture images of the object or scene, and wherein the captured images are used to generate three-dimensional volumetric content representing the object or scene, according to some embodiments.

For example, FIG. 4A illustrates an object/scene (person 402) for which multiple images are being captured representing multiple views of the object/scene, when viewed from cameras located at different locations and viewing angles relative to the object/scene.

In FIG. 4A cameras 404, 406, 408, 410, and 412 view person 402 from different camera locations and/or viewing angles. For example, camera 412 captures a front center (FC) view of person 402, camera 408 captures a left side (LS) view of person 402, camera 410 captures a right side (RS) view of person 402, camera 404 captures a front left (FL) view of person 402, and camera 406 captures a front right (FR) view of person 402.

Figure 4B:
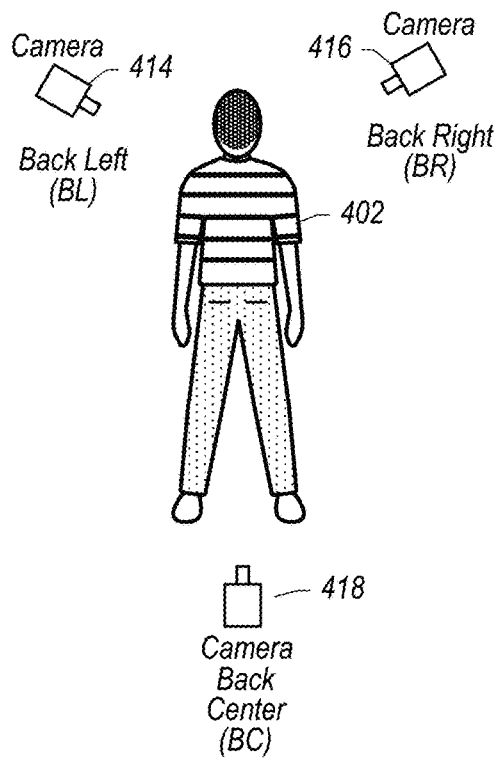
FIG. 4B illustrates a back view showing additional cameras located at different locations and/or camera angles relative to the object or scene, wherein the additional cameras capture images of the object or scene that are used to generate the three-dimensional volumetric content representing the object or scene, according to some embodiments.

FIG. 4B illustrates additional cameras that may be located behind person 402. For example, camera 418 captures a back center (BC) view of person 402, camera 414 captures a back left (BL) view of person 402, camera 416 captures a back right (BR) view of person 402, etc.

Figure 4C:
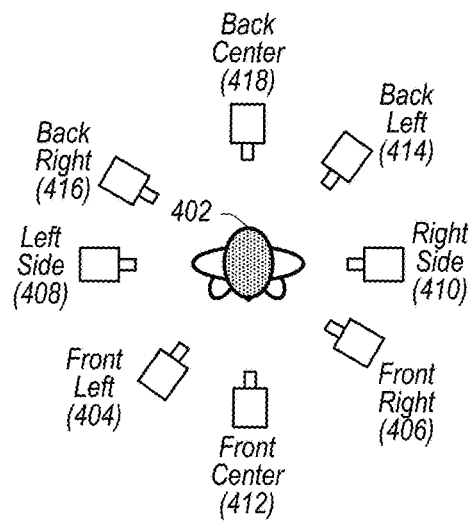
FIG. 4C illustrates a top view showing the cameras and the additional cameras located at the different locations and/or camera angles relative to the object or scene, wherein the cameras and the additional cameras capture the images of the object or scene that are used to generate the three-dimensional volumetric content representing the object or scene, according to some embodiments.

FIG. 4C is a top view illustrating the cameras shown in FIGS. 4A and 4B that are located at different locations and viewing angles relative to person 402. Note that the camera positions and camera angles shown in FIGS. 4A-4C are given as an example configuration and in some embodiments other camera configurations may be used. For example, in some embodiments, when capturing images for a scene, the cameras may face outward towards the scene as opposed to pointing inward towards an object, as shown in FIG. 4C. Also, in some embodiments, the cameras may not necessarily be arranged in a circular configuration, but may instead be arranged in other configurations, such as a square, rectangle, grid pattern, etc.

Figure 4D:
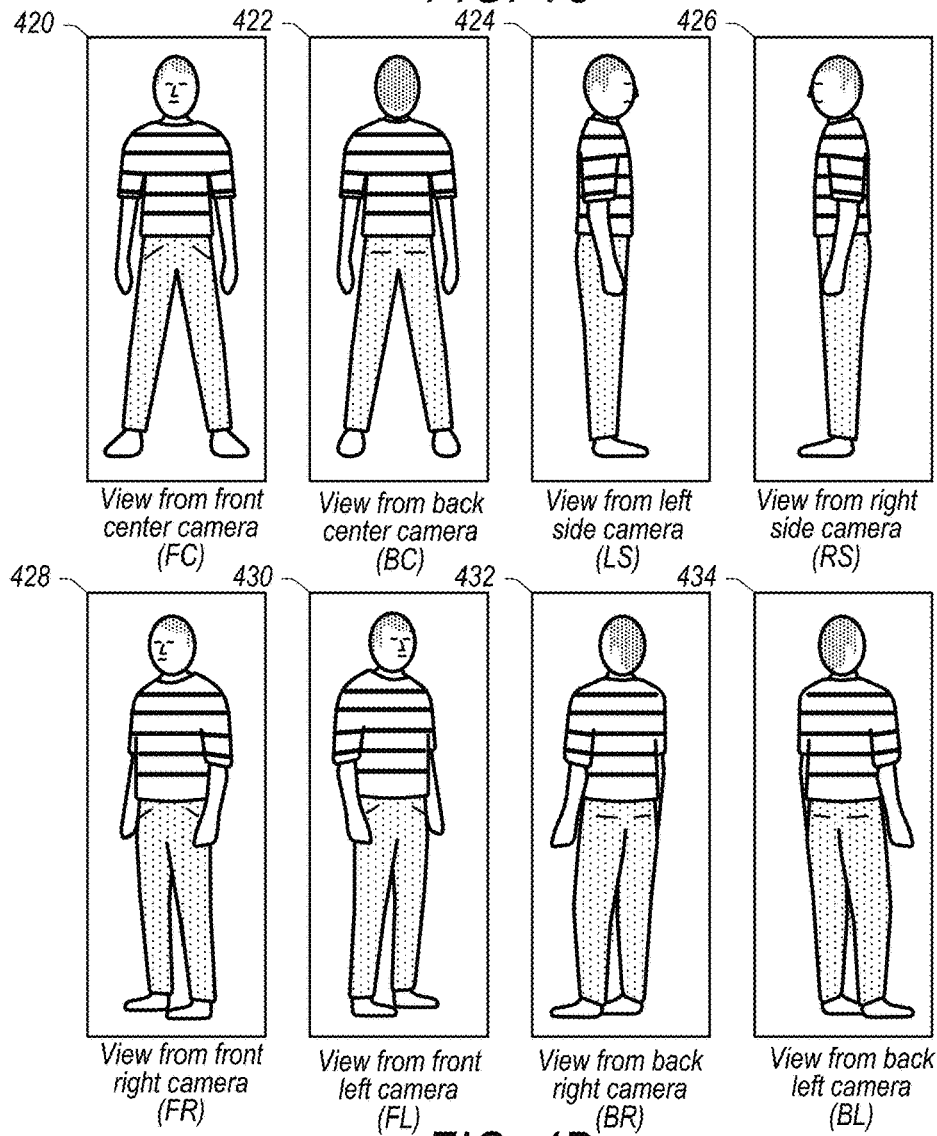
FIG. 4D illustrates respective views of the object or scene captured by the cameras and the additional cameras located at the different locations and/or camera angles relative to the object or scene, according to some embodiments.

FIG. 4D illustrates images that may have been captured via cameras 404-418 as shown in FIGS. 4A-4C. For example image 420 shows a front center (FC) view, image 422 shows a back center (BC) view, image 424 shows a left side (LS) view, image 426 shows a right side (RS) view, image 428 shows a front right (FR) view, image 430 shows a front left (FL) view, image 434 shows a back right (BR) view, and image 434 shows a back left (BL) view.

In some embodiments, metadata is associated with each of the views as shown in FIG. 4D, wherein the metadata (e.g. source camera parameters) indicate locations and camera angles for the respective cameras 404-418 that were used to capture images 420-434. In some embodiments, this metadata may be used to determine geometry information for the object or scene that is being captured by the respective cameras, such as X, Y, and Z coordinates of points of the object or scene (or other types of spatial information).

Figure 8:
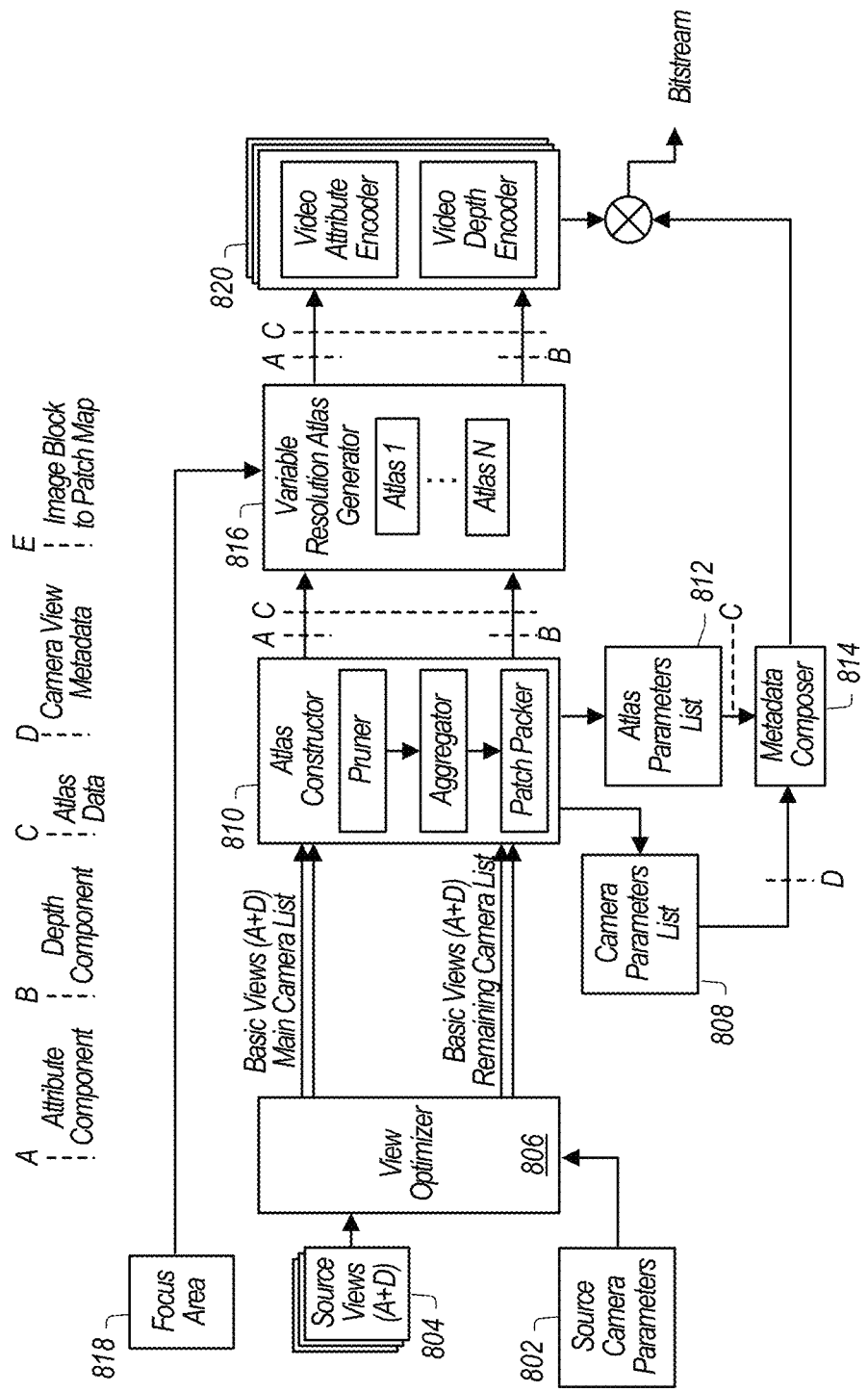
FIG. 8 illustrates a block diagram for an encoder configured to encode three-dimensional (3D) volumetric content using gaze-based simplification, according to some embodiments.

For example, a component of an encoder, such as an atlas constructor 810 (as shown in FIG. 8) may use source camera parameters (e.g. metadata indicating source camera parameters 802, such as camera location and orientation) along with the images captured from the cameras to determine distances to surfaces in the captured images from the cameras at the known locations with the known orientations. In turn, spatial information indicating locations in space for the surfaces may be determined using the determined distances from the cameras and the known locations and orientations of the cameras.

Figure 5:
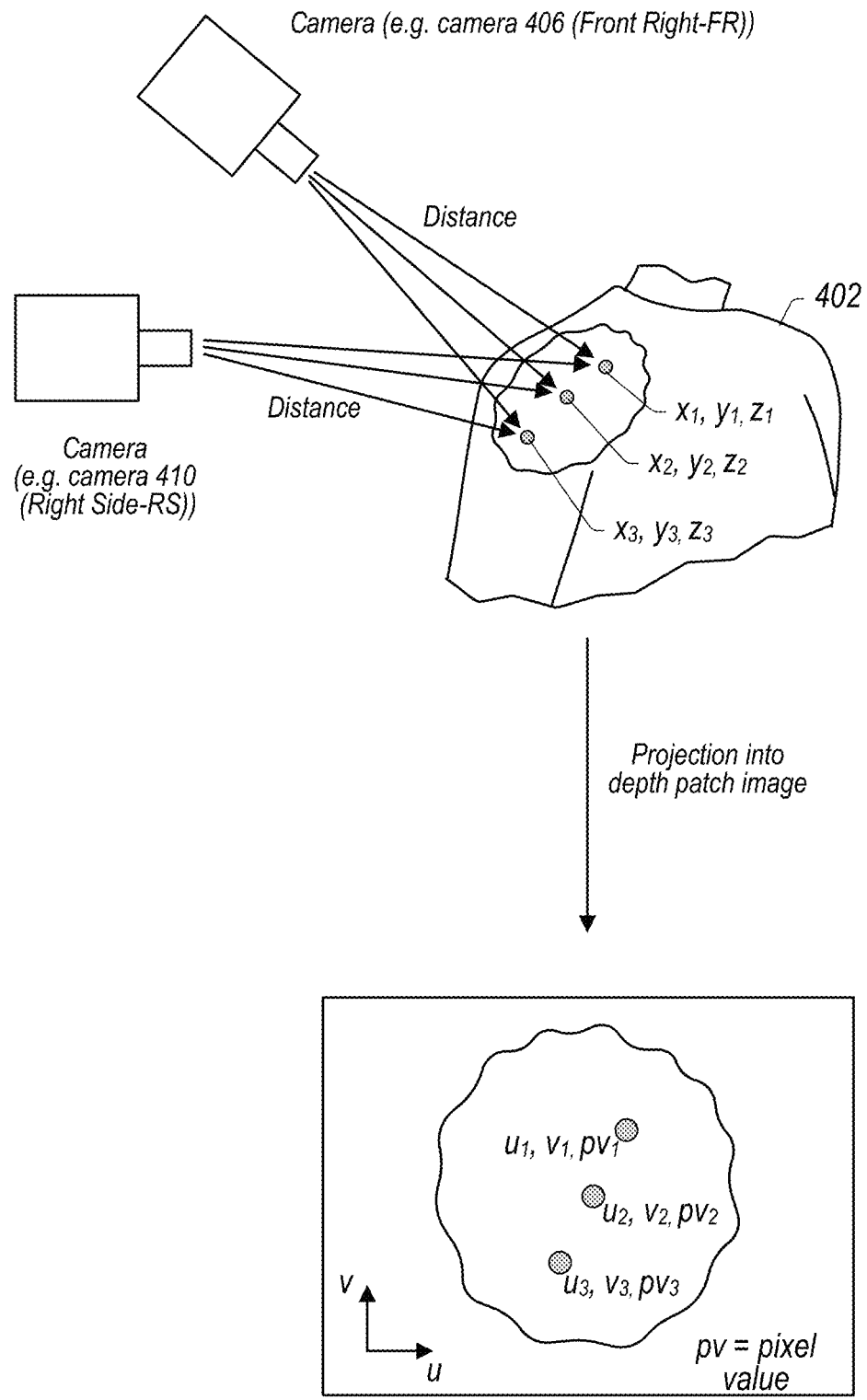
FIG. 5 illustrates depth values for a depth patch image being determined using camera location and camera angle information for multiple cameras that capture images for a same portion of the object or scene from the different locations and/or camera angles, according to some embodiments.

For example, as shown in FIG. 5, source camera parameters 802 may indicate locations and orientations for right side camera 410 and front right camera 406 that both capture images of a portion of a shoulder of person 402. Moreover, the atlas constructor 810 may determine that the cameras 406 and 410 are both capturing images comprising a same surface of the object (e.g. the portion of the person's shoulder). For example, pixel value patterns in the images may be matched to determine that images from both cameras 406 and 410 are capturing the same portion of the person 402's shoulder. Using the source camera parameters 802 and knowing points in the captured images that are located at a same location in 3D space, the atlas constructor 810 may determine a location in 3D space of the matching portions of the captured images (e.g. the portion of person 402's shoulder). Based on this determination using the known locations and orientations of cameras 406 and 410, the atlas constructor 810 may determine geometry/spatial information for the portion of the object, such as X, Y, and Z coordinates for points included in the matching portion of the person 402's shoulder.

Furthermore, the spatial/geometry information may be represented in the form of a depth map (also referred to herein as a depth patch image). For example, the spatial information for the person's shoulder, e.g. points with coordinates $X_1, Y_1, Z_1$; $X_2, Y_2, Z_2$; and $X_3, Y_3, Z_3$, may be projected onto a flat plane of a depth map, wherein the X and Y spatial information is represented by a location of a given point in the depth map. For example, X values may be represented by locations of the points along a width of the depth map (e.g. the "U" direction) and Y values may be represented by locations of the points along the height of the depth map (e.g. the "V" direction). Moreover, the Z values of the points may be represented by pixel values ("pv") associated with the points at locations (U,V). For example, a first point with coordinates in 3D space of $X_1, Y_1, Z_1$ may be represented in the depth map at pixel ($U_1, V_1$) which has pixel value $pv_1$, wherein darker pixel values indicate lower Z values and lighter pixel values indicate greater Z values (or vice versa).

In some embodiments, depth maps may only be generated for views that are to be included in an atlas. For example, depth maps may not be generated for redundant views or redundant portions of views that are omitted from the atlas. Though, in some embodiments, image data and source camera parameters of all views may be used to generate the depth maps, but the redundant views may not be included in the generated depth maps. For example, whereas cameras 406 and 410 capture redundant information for the person 402's shoulder, a single depth map may be generated for the two views as opposed to generating two redundant depth maps for the person's shoulder. However the images captured from cameras 406 and 410 that redundantly view the person's shoulder from different locations/camera viewing angles may be used to determine the spatial information to be included in the single depth map representing the person's shoulder.

Generating Non-Redundant Views for an Atlas/Depth Map

Figure 6:
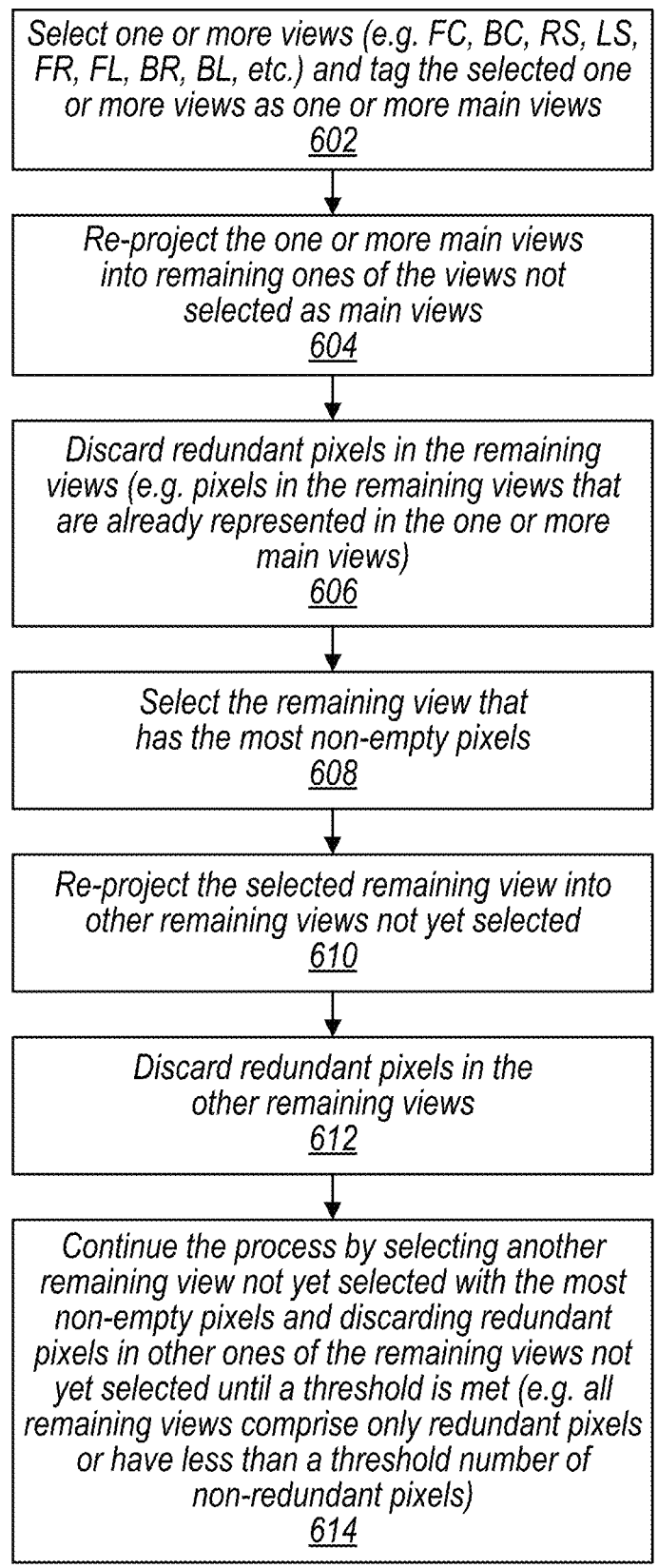
FIG. 6 illustrates a flowchart for an example process for generating an atlas from the captured views, wherein redundant information included in a given view already included in the atlas is omitted from other views that are to be included in the atlas, according to some embodiments.

FIG. 6 illustrates a flowchart for an example process for generating an atlas from the captured views, wherein redundant information already included in a given view already included in the atlas is omitted from other views that are to be included in the atlas, according to some embodiments.

At block 602, a view optimizer (such as view optimizer 806 of the encoder shown in FIG. 8) receives source views comprising both attribute and depth information, such as source views comprising views 420-434 illustrated in FIG. 4D. The view optimizer also selects one of the received views as a main view. In some embodiments, the view optimizer may also receive source camera parameters, such as source camera parameters 802, which indicate locations and orientations of the cameras that captured the source views.

The view optimizer may select one or more main views and tag the selected views as main views. In order to determine a ranking (e.g. ordered list of the views) at block 604 the view optimizer then re-projects the selected one or more main views into remaining ones of the views that were not selected as main views. For example, the front center view (FC) 420 and the back center view (BC) 422 may be selected as main views and may be re-projected into the remaining views, such as views 424-434. At block 606, the view optimizer determines redundant pixels, e.g. pixels in the remaining views that match pixels of the main views that have been re-projected into the remaining views. For example, portions of front right view 428 are redundant with portions of front center view 420, when pixels of front right view 428 are re-projected into front center view 420. In the example, these redundant pixels are already included in the main view (e.g. view 420 from the front center (FC)) and are omitted from the remaining view (e.g. view 428 from the front right (FR)).

The view optimizer (e.g. view optimizer 806) may iteratively repeat this process selecting a next remaining view as a "main view" for a subsequent iteration and repeat the process until no redundant pixels remain, or until a threshold number of iterations have been performed, or another threshold has been met, such as less than X redundant pixels, or less than Y total pixels, etc. For example, at block 610 the re-projection is performed using the selected remaining view (e.g. selected at 608) as a "main view" to be re-projected into other ones of the remaining views that were not selected as "main views" for this iteration or a previous iteration. Also, at block 612 redundant pixels identified based on the re-projection performed at 610 are discarded. At block 614 the process (e.g. blocks 608-612) are repeated until a threshold is met (e.g. all remaining views comprise only redundant pixels or have less than a threshold number of non-redundant pixels, etc.). The threshold may be measured also be based on all of the remaining views having empty pixels (e.g. they have already been discarded) or all of the remaining views have less than a threshold number of non-empty pixels.

The ordered list of views having non-redundant information may be provided from the view optimizer (e.g. view optimizer 806) to an atlas constructor of an encoder (e.g. atlas constructor 810 as shown in FIG. 8). Additionally, the source camera parameters 802 may be provided from the view optimizer 806 to the atlas constructor 810.

The atlas constructor 810 may prune the empty pixels from the respective views (e.g. the pixels for which redundant pixel values were discarded by the view optimizer 806). This may be referred to as "pruning" the views as shown being performed in atlas constructor 810. The atlas constructor 810 may further aggregate the pruned views into patches (such as attribute patch images and geometry patch images) and pack the patch images into respective image frames.

Figure 7:
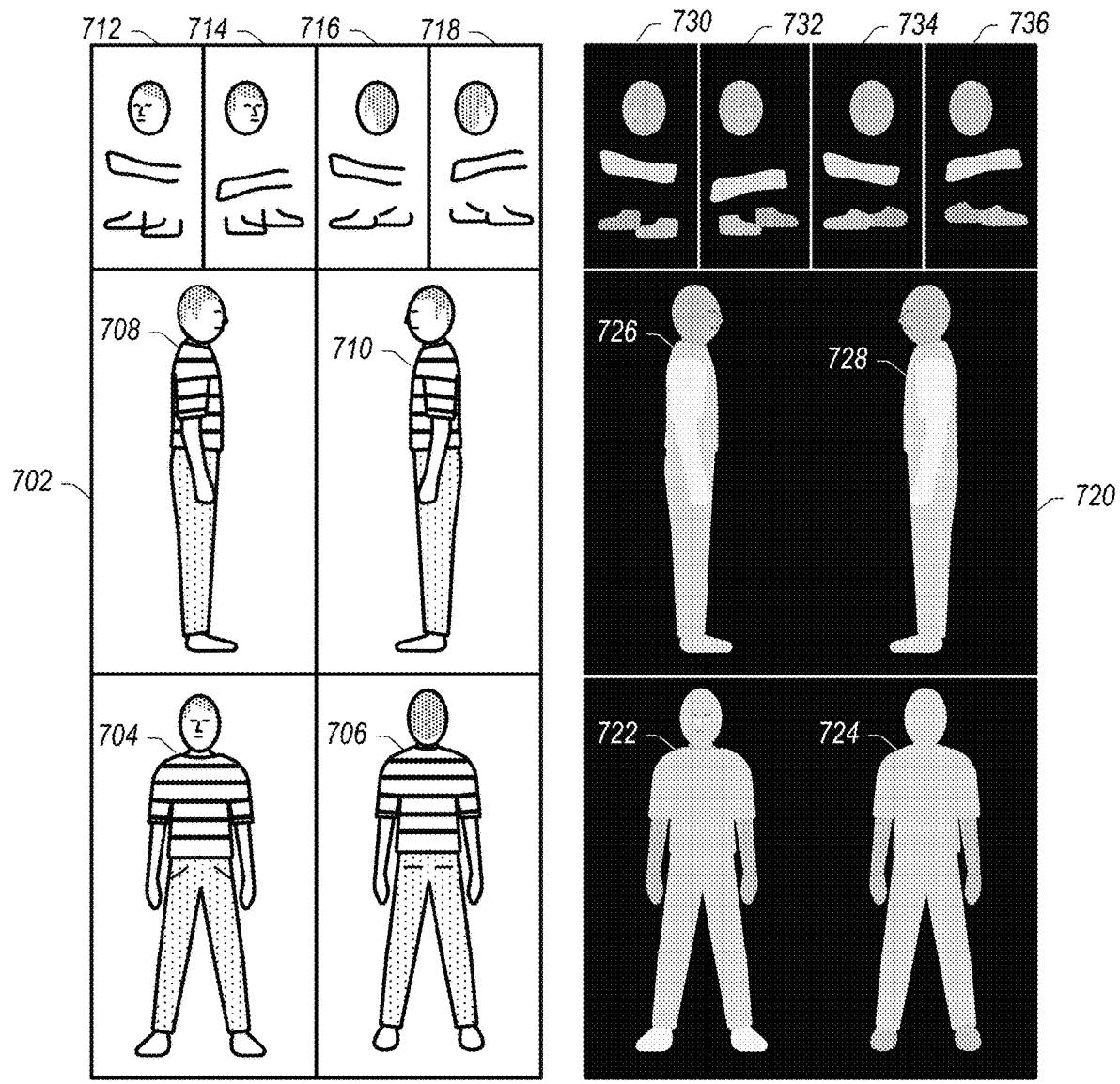
FIG. 7 illustrates an atlas comprising packed attribute patch images representing views included in the atlas, wherein redundant information has been omitted and also illustrates a corresponding atlas/depth map comprising depth patch images that correspond with the attribute patch images included in the adjacent attribute patch image atlas, according to some embodiments.

For example, FIG. 7 illustrates an atlas comprising packed attribute patch images representing views included in the atlas, wherein redundant information has been omitted and also illustrates a corresponding atlas/depth map comprising depth patch images that correspond with the attribute patch images included in the adjacent attribute patch image atlas, according to some embodiments.

Attribute patch images 704 and 706 for main views 420 and 422 are shown packed in the atlas 702. Also, patch images 708 and 710 comprising non-redundant pixels for views 424 and 426 are shown packed in atlas 702. Additionally, attribute patch images 712, 714, 716, and 718 comprising non-redundant pixels for remaining views 428, 430, 432, and 434 are shown packed in atlas 702.

Atlas 720/depth map 720 comprises corresponding depth patch images 722-736 that correspond to the attribute patch images 704-718 packed into attribute atlas 702.

FIG. 8 illustrates a block diagram for an encoder configured to encode three-dimensional (3D) volumetric content using video encoded attribute patch images and video encoded depth patch images using gaze-based simplification, according to some embodiments.

As discussed above, source camera parameters 802 indicating location and orientation information for the source cameras, such as cameras 404-418 as illustrated in FIGS. 4A-4C are provided to the view optimizer 806. Also source views 804 which, include both attributes (e.g. colors, textures, etc.) and depth information are provided to view optimizer 806. The view optimizer 806 determines main views and remaining views as discussed in regard to FIG. 6. The view optimizer 806 and/or the pruner of atlas constructor 810 may further disregard redundant pixels as described in FIG. 6. For example, the view optimizer may mark redundant pixels as empty and the pruner of atlas constructor 810 may prune the empty pixels. Note, the main views and remaining views along with camera lists comprising source camera parameter metadata comprising location and orientation information for the cameras that captured the main and remaining views are provided to atlas constructor 810. As shown in FIG. 8, the atlas constructor 810 prunes the views (main and remaining) to remove empty pixels. The atlas constructor 810 further aggregates the pruned views into patches and packs the patches into a 2D video image frame. For example, in atlas 702 redundant/empty pixels have been pruned from views 428, 430, 432, and 434. Also as shown in atlas 702 for views 428, 430, 432, and 434, the remaining (non-pruned) portions of these views have been aggregated into attribute patch images 712, 714, 716, and 718. These attribute patch images have further been packed into atlas 702, which may have a same size/resolution as the video image frame comprising the attribute patch images (e.g. atlas 702). It is worth pointing out that open space has been included in atlas 702 for ease of illustration. However, in at least some embodiments, the non-redundant portions of the views may be more closely packed into smaller patch images with less open space than what is shown in FIG. 7.

The atlas generated by atlas constructor 810 is provided to variable resolution atlas generator 816, which also receives information 818 for one or more focus areas indicated in a request for 3D volumetric content. Based on the requested focus area (or pre-emptively determined anticipated focus area) the variable resolution atlas generator 816 generates atlas versions 1 through N, each corresponding to a different focus area. For example, atlas versions 1 through N generated/stored by variable resolution atlas generator 816 may correspond to attribute atlases 106A through 106N described in FIGS. 1 and 2.

Additionally, atlas constructor 810 generates an atlas parameters list 812, such as bounding box sizes and locations of the patch images in the packed atlas and depth map. The atlas constructor 810 also generates a camera parameters list 808. For example, atlas constructor 810 may indicate in the atlas parameters list 812 that an attribute patch image (such as attribute patch image 704) has a bounding box size of M×N and has coordinates with a bottom corner located at the bottom left of the atlas. Additionally, an index value may be associated with the patch image, such as that it is a $1^{st}$, $2^{nd}$ etc. patch image in the index. Additionally, camera parameter list 808 may be organized by or include the index entries, such that camera parameter list includes an entry for index position 1 indicating that the camera associated with that entry is located at position X with orientation Y, such as camera 412 (the front center FC camera that captured view 420 that was packed into patch image 704).

Metadata composer 814 may entropy encode the camera parameter list 808 and entropy encode the atlas parameter list 812 as entropy encoded metadata. The entropy encoded metadata may be included in a compressed bit stream long with video encoded packed image frames comprising attribute patch images and depth maps that have been encoded via encoder 820.

In some embodiments, an encoder may, in response to a request for 3D volumetric content, provide a depth map and a focus area specific attribute atlas. The depth map and the focus area attribute atlas may be video encoded and included in a bit stream. Additionally, metadata from metadata composer 814 may be entropy encoded and included in the bit stream.

Figure 9:
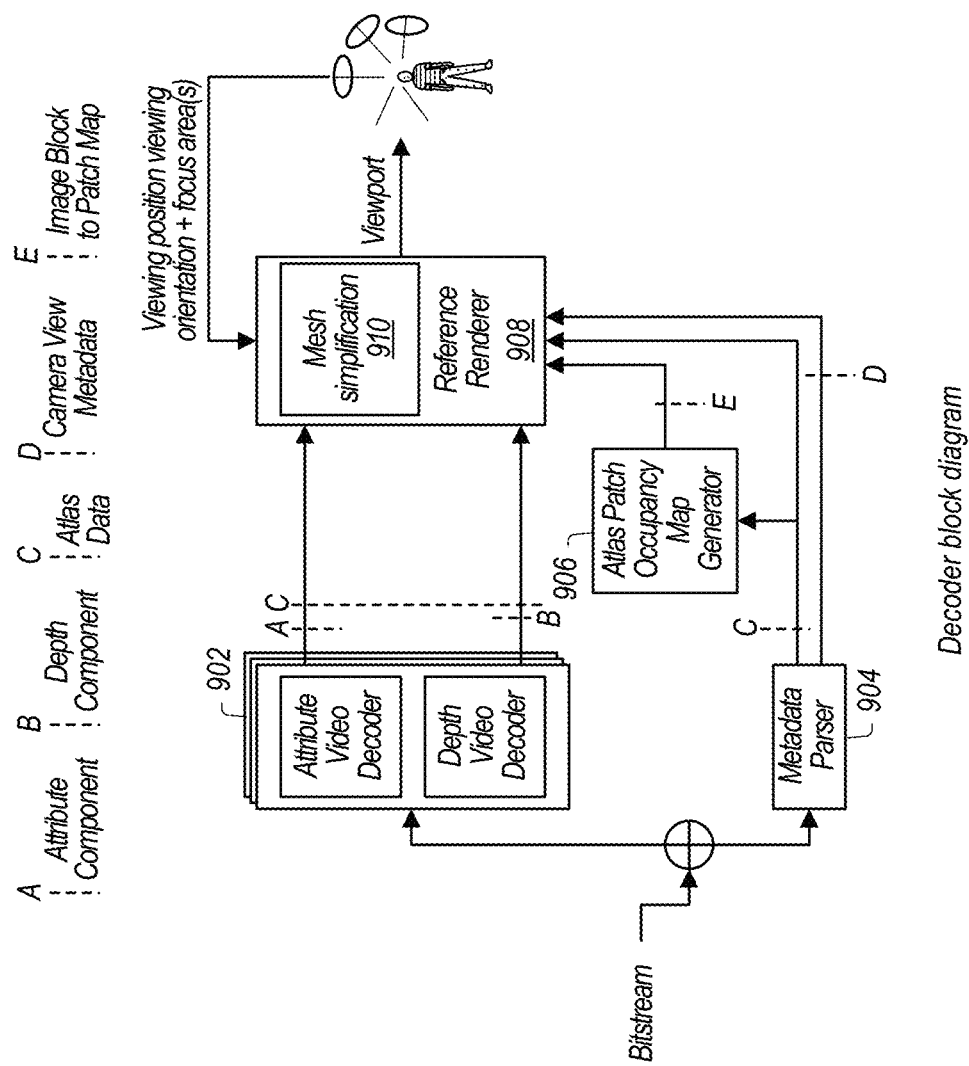
FIG. 9 illustrates a block diagram for a decoder configured to decode the encoded 3D volumetric content, wherein the decoder applies gaze-based simplification, according to some embodiments.

FIG. 9 illustrates a block diagram for a decoder configured to use video encoded attribute patch images and a video encoded depth map to generate a reconstructed version of encoded 3D volumetric content, according to some embodiments.

The compressed bit stream may be provided to a decoder, such as the decoder shown in FIG. 9. The entropy encoded metadata may be directed to a metadata parser 904 and the video encoded image frames comprising attribute patch images packed in the image frames, and the depth patch images packed in the same image frame or an additional image frame may be provided to decoder 902, which may video decode the attribute image frames and the depth image frames (e.g. depth maps). The decoded atlas (or set of complimentary decoded atlases) comprising attribute patch images and depth patch images may be provided to reference renderer 908 along with atlas patch occupancy maps that have been generated by atlas patch occupancy map generator 906 using the entropy decoded atlas parameter list. Also, the camera view metadata included in the entropy decoded metadata may be provided to reference renderer 908. For example, camera parameter list metadata may be used by reference renderer 908 to select a given view of the 3D volumetric content to render based on a user manipulation of the viewport (e.g. viewing position and viewing orientation information received by the reference renderer 908).

A mesh simplification module 910 of the reference renderer 908 may use the determined/indicated focus area to simplify a mesh generated from the decoded depth map. For example, a higher vertices budget may be applied to areas of the mesh in the focus area while a lower vertices budget may be applied to areas outside of the focus area. Additionally, the reference renderer 908 may project textures included in the attribute atlas onto the generated mesh representation and fill holes using hole filling techniques with varying levels of complexity based on focus area, such as described in FIGS. 1-3.

Example Decoding Process Using Gaze-Based Simplification

Figure 10:
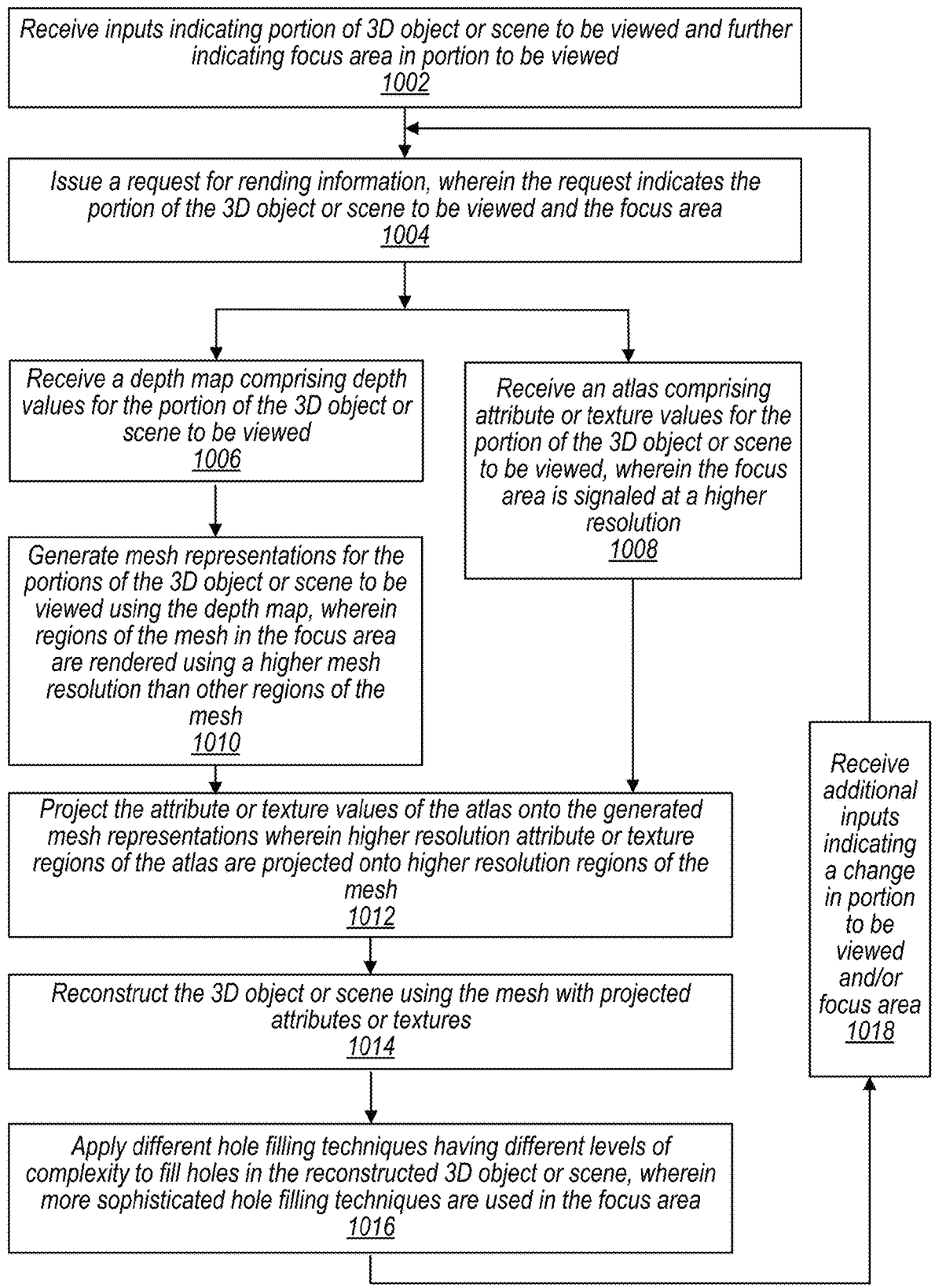
FIG. 10 is a flow chart illustrating a decoding process for decoding a bit stream comprising compressed three-dimensional volumetric content, wherein gaze-based simplification is applied in decoding/rendering the three-dimensional volumetric content, according to some embodiments.

FIG. 10 is a flow chart illustrating a decoding process for decoding a bit stream comprising compressed three-dimensional volumetric content, wherein gaze-based simplification is applied in decoding/rendering the three-dimensional volumetric content, according to some embodiments.

At block 1002, a decoder (such as may be included in client device 108) receives inputs indicating a portion of 3D object or scene to be viewed and further indicating one or more focus areas in the portion to be viewed. At block 1004, the decoder issues a request to a server (such as server 102) requesting rendering information, wherein the request indicates the portion of the 3D object or scene to be viewed and the one or more focus areas. At block 1006, the decoder receives a depth map comprising depth values for the portion of the 3D object or scene to be viewed and at block 1008, the decoder receives an atlas comprising attribute or texture values for the portion of the 3D object or scene to be viewed, wherein the one or more focus areas are signaled at a higher resolution. At block 1010, the decoder generates mesh representations for the portions of the 3D object or scene to be viewed using the depth map, wherein regions of the mesh in the one or more focus areas are rendered using a higher mesh resolution than other regions of the mesh.

At block 1012, the decoder projects the attribute or texture values of the atlas onto the generated mesh representations wherein higher resolution attribute or texture regions of the atlas are projected onto higher resolution regions of the mesh. At block 1014, the decoder reconstructs the 3D object or 3D scene using the mesh representations with projected attribute or texture values projected onto them. At block 1016, the decoder applies different hole filling techniques having different levels of complexity to fill holes in the reconstructed 3D object or scene, wherein more sophisticated hole filling techniques are used in the one or more focus areas.

At block 1018, the decoder receives additional inputs indicating a change in portion to be viewed and/or focus area and repeats the process starting at block 1004 for the updated portion or focus area to be viewed.

Example Encoding Process Using Gaze-Based Simplification

Figure 11:
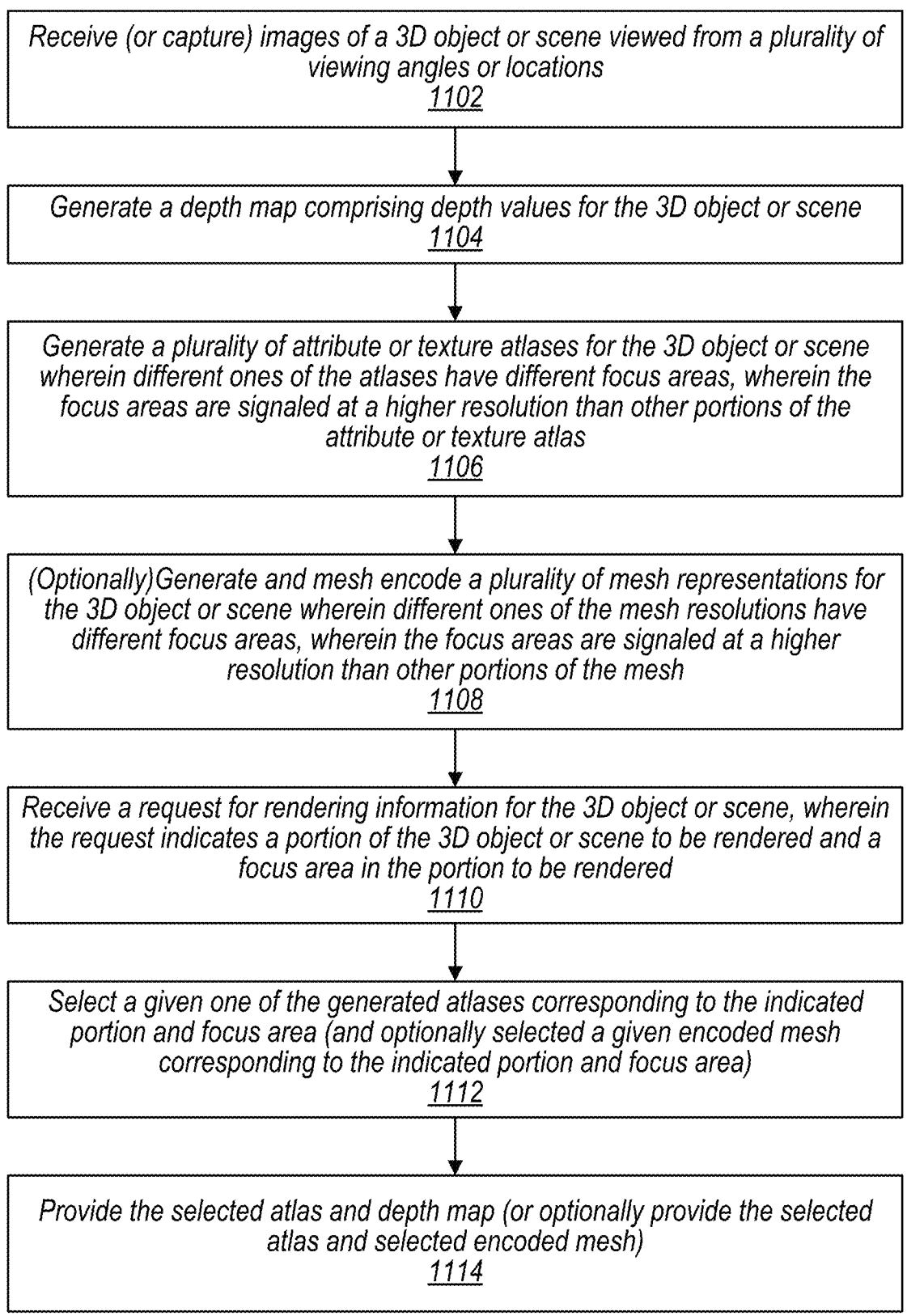
FIG. 11 is a flow chart illustrating an encoding process for encoding compressed three-dimensional volumetric content using gaze-based simplification, according to some embodiments.

FIG. 11 is a flow chart illustrating an encoding process for encoding compressed three-dimensional volumetric content using gaze-based simplification, according to some embodiments.

At block 1102, an encoder receives (or captures) images of a 3D object or scene viewed from a plurality of viewing angles or locations. At block 1104, the encoder generates a depth map comprising depth values for the 3D object or scene. At block 1106, the encoder generates a plurality of attribute or texture atlases for the 3D object or scene wherein different ones of the atlases have different focus areas, wherein the focus areas are signaled at a higher resolution than other portions of the attribute or texture atlas.

In some embodiments, at block 1108, the encoder optionally generates and mesh encodes a plurality of mesh representations for the 3D object or scene wherein different ones of the mesh representations have different focus areas, wherein the focus areas are signaled at a higher resolution than other portions of the mesh. In some embodiments, the encoder may omit block 1108 and instead signal a depth map to a decoding device, such as client device 108, wherein the decoding device performs mesh simplification based on gaze direction (e.g. focus area).

At block 1110, the encoder receives a request for rendering information for the 3D object or scene, wherein the request indicates a portion of the 3D object or scene to be rendered and a focus area in the portion to be rendered. At block 1112, the encoder selects a given one of the generated atlases corresponding to the indicated portion and focus area (and optionally selects a given encoded mesh corresponding to the indicated portion and focus area). And, at block 1114, the encoder provides the selected atlas and depth map (or optionally provides the selected atlas and selected encoded mesh) to a decoding device, such as client device 108.

Example Computer System

Figure 12:
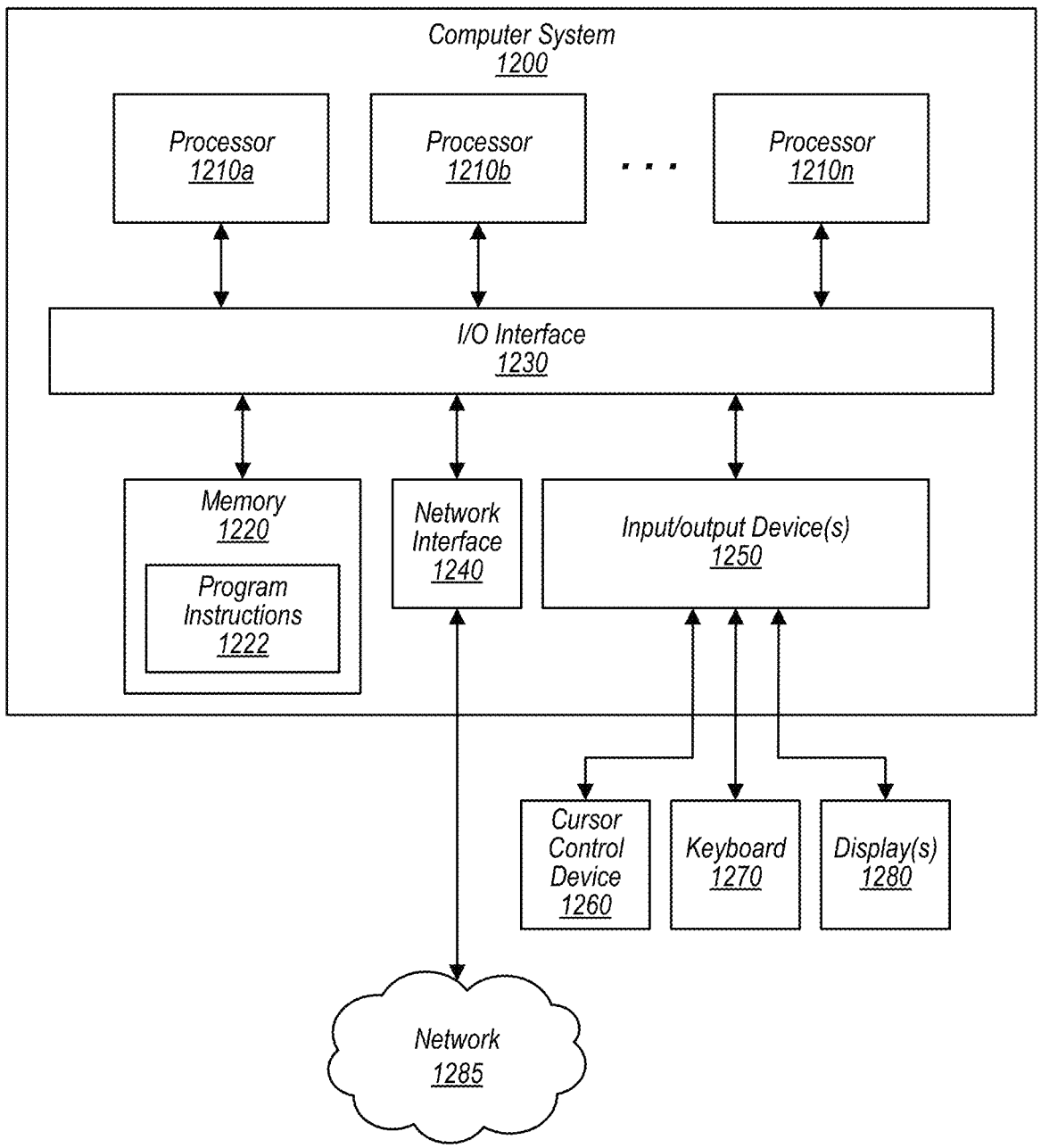
FIG. 12 illustrates an example computer system that may implement an encoder or decoder, according to some embodiments.

FIG. 12 illustrates exemplary computer system 1200 used to implement an encoder or decoder as described above with reference to FIGS. 1-11. In different embodiments, computer system 1200 may be any of various types of devices, including, but not limited to, a personal computer system, desktop computer, laptop, notebook, tablet, slate, pad, or netbook computer, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280.

System memory 1220 may be configured to store compression or decompression program instructions 1222 and/or sensor data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions 1222 may be configured to implement an encoder or decoder incorporating any of the functionality described above. In some embodiments, program instructions and/or data may be received, sent or stored upon different types of computer-accessible media or on similar media separate from system memory 1220 or computer system 1200.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1222, which may be processor-executable to implement any element or action described above. In one embodiment, the program instructions may implement the methods described above. In other embodiments, different elements and data may be included.

Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow

What is claimed is:

1. A non-transitory, computer-readable, medium storing program instructions, that when executed using one or more processors, cause the one or more processors to:

issue a request for information for rendering volumetric visual content, wherein the request indicates a portion of the volumetric visual content to be displayed and indicates a focus area within the portion;

receive a depth map comprising depth values for the portion of the volumetric visual content;
receive an atlas, selected from a plurality of atlases, comprising attribute or texture values for the portion of the volumetric visual content, wherein:
   attributes or textures of the focus area are signaled in the atlas at a higher resolution than other areas of the portion;
   the plurality of atlases were generated based on images captured from a plurality of camera viewing angles and comprise attribute values for views of the portion of the volumetric visual content; and
   the atlas was selected from the plurality of atlases based on the focus area within the portion of the object or scene to be displayed;
generate, based on the depth values included in the depth map, one or more mesh representations for the portion, the one or more mesh representations comprising a higher resolution mesh for the focus area and a lower resolution mesh for other parts of the portion; and
project the attribute or texture values indicated in the atlas onto the generated one or more mesh representations, wherein the higher resolution attribute or textures of the focus area are projected onto the higher resolution parts of the one or more mesh representations of the focus area.

2. The non-transitory, computer-readable, medium of claim 1, wherein the program instructions, when executed using the one or more processors, further cause the one or more processors to:
   reconstruct the portion of the volumetric visual content using the one or more mesh representations that have had the attribute or texture values projected onto them; and
   fill holes in a reconstructed version of the portion of the volumetric visual content, wherein:
      a first hole filling technique is used for filling holes in the focus area; and
      one or more other hole filling techniques are used for filling holes in other regions of the reconstructed version of the portion of the volumetric visual content.

3. The non-transitory, computer-readable, medium of claim 1, wherein the program instructions, when executed using the one or more processors, further cause the one or more processors to:
   receive inputs from one or more sensors;
   determine, based on the inputs, the portion of the volumetric visual content to be displayed; and
   determine, based on the inputs, an area within the portion of the volumetric visual content that is the focus area for viewing the portion of the volumetric visual content.

4. The non-transitory, computer-readable, medium of claim 3, wherein:
   at least some of the one or more sensors are included in a head-mounted display; and
   the focus area is determined to correspond to a gaze direction of a user wearing the head-mounted display.

5. The non-transitory, computer-readable, medium of claim 3, wherein:
   at least some of the one or more sensors include a camera viewing a user; and
   the focus area is determined based on a pose or a body motion of the user.

6. The non-transitory, computer-readable, medium of claim 3, wherein the program instructions, when executed using the one or more processors, further cause the one or more processors to:
   receive additional inputs from the one or more sensors;
   determine, based on the additional inputs, an updated area within the portion of the volumetric visual content that is an updated focus area for viewing the portion of the volumetric visual content;
   issue another request for information for rendering the portion of the volumetric visual content, wherein the other request indicates the updated focus area within the portion of the volumetric visual content to be displayed;
   receive an updated atlas comprising attributes or textures for the updated focus area, wherein attribute or texture values in the updated focus area are signaled at a higher resolution than other areas of the portion;
   generate, based on the depth values included in the depth map, one or more updated mesh representations of the portion, the one or more updated mesh representations comprising higher resolution mesh for the updated focus area and a lower resolution mesh for other parts of the portion; and
   project the attribute or texture values indicated in the updated atlas onto the updated one or more mesh representations, wherein the higher resolution attribute or textures of the updated focus area are projected onto the higher resolution parts of the updated one or more mesh representations.

7. The non-transitory, computer-readable, medium of claim 6, wherein the program instructions, when executed using the one or more processors, further cause the one or more processors to:
   receive inputs from one or more sensors;
   predict, based on the inputs, the updated focus area; and
   issue the other request to pre-fetch the updated atlas in response to a current focus area changing in a direction toward the updated focus area by more than the threshold amount.

8. The non-transitory, computer-readable, medium of claim 1, wherein:
   the atlas comprises attribute or texture values signaled at three or more different resolutions, wherein:
      a first one of the three or more different resolutions corresponds to a central part of the focus area;
      one or more additional ones of the three or more different resolutions correspond to one or more peripheral parts of the focus area; and
      another one of the three or more different resolutions corresponds to other parts of the portions of the volumetric visual content outside of the focus area.

9. The non-transitory, computer-readable, medium of claim 8, wherein to generate the mesh representation of the portion of the volumetric visual content to be displayed, the program instructions, when executed using the one or more processors, cause the one or more processors to:
   allocate a first mesh resolution to a first part of the one or more mesh representations in the central part of the focus area;
   allocate one or more other mesh resolutions to one or more other parts of the one or more mesh representations in the one or more peripheral parts of the focus area; and
   allocate another mesh resolution to one or more additional parts of the one or more mesh representations outside of the focus area.

10. The non-transitory, computer-readable, medium of claim 9, wherein the program instructions, when executed using the one or more processors, further cause the one or more processors to:
- fill holes in the central part of the focus area using a first hole filling technique;
- fill holes in the one or more peripheral parts of the focus area using one or more other hole filling techniques; and
- for the one or more additional parts outside of the focus area, refrain from filling holes or fill the holes in the one or more additional parts outside of the focus area using a different hole filling technique.

11. A non-transitory, computer-readable, medium storing program instructions, that when executed using one or more processors, cause the one or more processors to:
- receive images of an object or scene, wherein the images are captured from a plurality of camera viewing angles; and
- generate based on the received images:
  - a depth map comprising depth values for views of a portion of the object or scene; and
  - a plurality of atlases comprising attribute values for views of a portion of the object or scene, wherein the plurality of atlases comprise:
    - a first atlas comprising attributes or textures of a first focus area for a portion of the object or scene that are signaled at a higher resolution than remaining areas of the object or scene included in the first atlas;
    - one or more additional atlases comprising attributes or texture of one or more other focus areas for the portion of the object or scene, wherein the attributes or texture for the one or more other focus areas of the one or more additional atlases are signaled at the higher resolution as compared to remaining areas of the object or scene included in the one or more additional atlases;
- receive a request indicating a portion of the object or scene to be displayed and further indicating a focus area within the portion of the object or scene to be displayed;
- select a given one of the plurality of atlases corresponding to the indicated portion of the object or scene to be displayed and comprising attribute or texture values signaled at a higher resolution for a focus area corresponding to the focus area indicated in the request; and
- provide, in response to the request, the selected atlas for the portion of the object or scene to be displayed.

12. The non-transitory, computer-readable, medium of claim 11, wherein the program instructions, when executed using the one or more processors, further cause the one or more processors to:
- generate, based on the depth values included in the depth map, a mesh representation of the portion of the object or scene to be displayed, wherein the mesh representation comprises a higher resolution mesh for one or more parts of the mesh representation in the focus area and a lower resolution mesh for other parts of the mesh representation; and
- provide a mesh encoded version of the generated mesh representation having the higher resolution mesh for the focus area and the lower resolution mesh for other parts of the mesh representation.

13. The non-transitory, computer-readable, medium of claim 11, wherein the program instructions, when executed using the one or more processors, further cause the one or more processors to:
- provide the depth map for the portion of the object or scene to be displayed, wherein a decoder generates a mesh for the object or scene using the provided depth map.

14. The non-transitory, computer-readable, medium of claim 11, wherein:
- respective ones of the plurality of atlases comprise, for the respective focus areas, attribute or texture values signaled at three or more different resolutions, wherein:
  - a first one of the three or more different resolutions corresponds to a central part of a the respective focus area;
  - one or more additional ones of the three or more different resolutions correspond to one or more peripheral parts of the respective focus area; and
  - another one of the three or more different resolutions corresponds to parts of the object or scene outside of the focus area.

15. A device, comprising:
- a memory storing program instructions; and
- one or more processors, wherein the program instructions, when executed using the one or more processors, cause the one or more processors to:
  - issue a request for information for rendering volumetric visual content, wherein the request indicates a portion of the volumetric visual content to be displayed and indicates a focus area within the portion of the volumetric visual content to be displayed;
  - receive a depth map comprising depth values for the portion of the volumetric visual content;
  - receive an atlas comprising attribute or texture values for the portion of the volumetric visual content, wherein attributes or textures of the focus area are signaled in the atlas at a higher resolution than other areas of the portion;
  - generate, based on the depth values included in the depth map, one or more mesh representations of the portion, the one or more mesh representations comprising a higher resolution mesh for one or more parts of the one or more mesh representations in the focus area and a lower resolution mesh for other parts of the one or more mesh representations;
  - project the attribute or texture values indicated in the atlas onto the generated one or more mesh representations, wherein the higher resolution attributes or textures of the focus area are projected onto the higher resolution mesh parts of the one or more mesh representations of the focus area;
  - issue another request for information for rendering the volumetric visual content, wherein the other request indicates the same portion of the volumetric visual content to be displayed but indicates a different focus area within the portion of the volumetric visual content to be displayed;
  - receive another atlas comprising attribute or texture values for the portion, wherein attributes or textures of the different focus area are signaled in the other atlas at a higher resolution than other attributes or texture for other areas of the portion;
  - generate, based on the depth values included in the depth map, another one or more mesh representations of the portion, the other one or more mesh representations comprising a higher resolution mesh for one or more parts of the other one or more mesh representations in the different focus area and a lower resolution mesh for other parts of the other one or more mesh representations; and project the other attribute or texture values indicated in the other atlas onto the generated other one or more mesh representations, wherein the higher resolution attributes or textures of the different focus area are projected onto the higher resolution mesh parts of the other one or more mesh representations of the different focus area.

16. The device of claim 15, wherein the program instructions, when executed using the one or more processors, further cause the one or more processors to:

reconstruct the volumetric visual content using the one or more mesh representations that have had the attribute or texture values projected onto them; and fill holes in a reconstructed version of the volumetric visual content, wherein:

a first hole filling technique is used for filling holes in the focus area; and one or more other hole filling techniques are used for filling holes in other areas of the reconstructed version of the volumetric visual content.

17. The device of claim 15, wherein the device comprises:

a head mounted display; and an inertial measurement unit, wherein the program instructions, when executed using the one or more processors, further cause the one or more processors to:

determine, based on measurements from the inertial measurement unit, the portion of the volumetric visual content to be displayed; and determine, based on the measurements from the inertial measurement unit, an area within the portion that is the focus area for viewing the volumetric visual content in the head mounted display, wherein the request indicates:

the portion of the volumetric visual content to be displayed determined based on the measurements from the inertial measurement unit; and the focus area determined based on the measurements from the inertial measurement unit.

18. The device of claim 15, wherein the device comprises:

a hands free display; and a camera viewing a user of the hands free display, wherein the program instructions, when executed using the one or more processors, further cause the one or more processors to:

determine the focus area based on a pose or body motion of the user.

19. The device of claim 15, wherein the program instructions, when executed using the one or more processors, further cause the one or more processors to:

receive inputs from one or more sensors;

determine, based on the inputs, the portion of the volumetric visual content to be displayed; and determine, based on the inputs, an area within the portion that is the focus area for viewing the volumetric visual content.

20. The device of claim 19, wherein the program instructions, when executed using the one or more processors, further cause the one or more processors to:

receive additional inputs from the one or more sensors;

determine, based on the additional inputs, an updated area within the portion that is an updated focus area for viewing the volumetric visual content;

issue another request for information for rendering the volumetric visual content, wherein the other request indicates the updated focus area within the portion to be displayed;

receive an updated atlas comprising attributes or textures for the updated focus area that are signaled at a higher resolution than other areas of the portion;

generate, based on the depth values included in the depth map, one or more updated mesh representations of the portion, wherein the one or more updated mesh representations comprise a higher resolution mesh for one or more parts of the one or more updated mesh representations in the updated focus area and a lower resolution mesh for other parts of the one or more updated mesh representations outside of the focus area; and project the attribute or texture values indicated in the updated atlas onto the one or more updated mesh representations, wherein the higher resolution attribute or textures of the updated focus area are projected onto the higher resolution mesh parts of the one or more updated mesh representations corresponding to the updated focus area.

* * * * *